(12) United States Patent
Seo et al.

(10) Patent No.: US 9,990,055 B2
(45) Date of Patent: Jun. 5, 2018

(54) METHOD OF ESTABLISHING COMMUNICATION LINK AND DISPLAY DEVICES THEREOF

(71) Applicant: Samsung Electronics Co., Ltd., Suwon-si (KR)

(72) Inventors: Joon-kyu Seo, Suwon-si (KR); Sang-keun Jung, Suwon-si (KR); Geun-ho Lee, Seongnam-si (KR); Jung-joo Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 13/974,361

(22) Filed: Aug. 23, 2013

(65) Prior Publication Data

US 2014/0055344 A1   Feb. 27, 2014

(30) Foreign Application Priority Data

Aug. 23, 2012   (KR) .................. 10-2012-0092540

(51) Int. Cl.
*G06F 3/03* (2006.01)
*G06F 1/16* (2006.01)
(Continued)

(52) U.S. Cl.
CPC .............. *G06F 3/03* (2013.01); *G06F 1/1652* (2013.01); *G06F 3/023* (2013.01); *G06F 3/0338* (2013.01);
(Continued)

(58) Field of Classification Search
CPC ........ G06F 1/1652; G06F 1/1641; G06F 3/03; G06F 3/023; G06F 3/0338; G06F 3/0487; G06F 2203/04102
(Continued)

(56) References Cited

U.S. PATENT DOCUMENTS 8,253,648 B2 *   8/2012   Nagai et al. ................... 345/1.3
2002/0180709 A1  12/2002   Lichtfuss
(Continued)

FOREIGN PATENT DOCUMENTS

CN   102089737 A   6/2011
EP   2613234 A1    7/2013
(Continued)

OTHER PUBLICATIONS

International Search Report and Written Opinion dated Dec. 10, 2013 issued by the International Searching Authority in counterpart Application No. PCT/KR2013/007582 (PCT/ISA/210 & PCT/ISA/237).
(Continued)

*Primary Examiner* — Steven G Sherman
(74) *Attorney, Agent, or Firm* — Sughrue Mion, PLLC

(57) ABSTRACT

Provided is a method of establishing, by a first display device, a communication link with a second display device, the method including operations of detecting a first bending motion occurring in the first display device; obtaining information about a second bending motion occurring in the second display device; and establishing a communication link for a data exchange with the second display device, based on a start time of the first bending motion and a start time of the second bending motion.

53 Claims, 22 Drawing Sheets

(51) Int. Cl.
  *G06F 3/023* (2006.01)
  *G06F 3/0338* (2013.01)
  *G06F 3/0487* (2013.01)

(52) U.S. Cl.
  CPC .. *G06F 3/0487* (2013.01); *G06F 2203/04102* (2013.01)

(58) Field of Classification Search
  USPC .................................................. 345/173, 156
  See application file for complete search history.

(56) References Cited

U.S. PATENT DOCUMENTS

| | | | |
|---|---|---|---|
| 2004/0008191 A1* | 1/2004 | Poupyrev et al. ............ | 345/184 |
| 2006/0026536 A1 | 2/2006 | Hotelling et al. | |
| 2007/0124503 A1* | 5/2007 | Ramos .................... | G06F 3/017 |
| | | | 709/248 |
| 2007/0188323 A1 | 8/2007 | Sinclair et al. | |
| 2008/0080407 A1* | 4/2008 | Abbate et al. ................ | 370/310 |
| 2009/0167633 A1* | 7/2009 | Cohen ...................... | G09G 5/14 |
| | | | 345/1.1 |
| 2009/0219247 A1 | 9/2009 | Watanabe et al. | |
| 2010/0011291 A1* | 1/2010 | Nurmi .......................... | 715/702 |
| 2010/0090971 A1* | 4/2010 | Choi et al. ................... | 345/173 |
| 2010/0141605 A1* | 6/2010 | Kang et al. .................. | 345/174 |
| 2010/0182265 A1* | 7/2010 | Kim et al. ................... | 345/173 |
| 2011/0163944 A1* | 7/2011 | Bilbrey et al. ............... | 345/156 |
| 2011/0183722 A1 | 7/2011 | Vartanian | |
| 2012/0002360 A1 | 1/2012 | Seo et al. | |
| 2012/0050153 A1* | 3/2012 | Dvortsov et al. ............. | 345/156 |
| 2012/0133621 A1* | 5/2012 | Kim .............................. | 345/204 |
| 2013/0215041 A1* | 8/2013 | Kim et al. ................... | 345/173 |

FOREIGN PATENT DOCUMENTS

| | | |
|---|---|---|
| KR | 10-2006-0040364 A | 5/2006 |
| KR | 10-2012-0002084 A | 1/2012 |
| RU | 2 398 356 C2 | 8/2010 |
| RU | 2010 142 156 A | 4/2012 |
| WO | 2011/126847 A2 | 10/2011 |

OTHER PUBLICATIONS

Communication dated May 25, 2016 issued by the Russian Patent Office in counterpart Russian Patent Application No. 2015110052.
Communication dated Jun. 29, 2016 issued by the European Patent Office in counterpart European Patent Application No. 13181547.4.
Communication dated Mar. 3, 2017, issued by the State Intellectual Property Office of P.R. China in counterpart Chinese Application No. 201380054185.8.
Communication dated Aug. 22, 2017, from the State Intellectual Property Office of People's Republic of China in counterpart Application No. 201380054185.8.
Communication issued by the State Intellectual Property Office of P.R. China on Dec. 14, 2017 in counterpart Chinese Patent Application No. 201380054185.8.

* cited by examiner

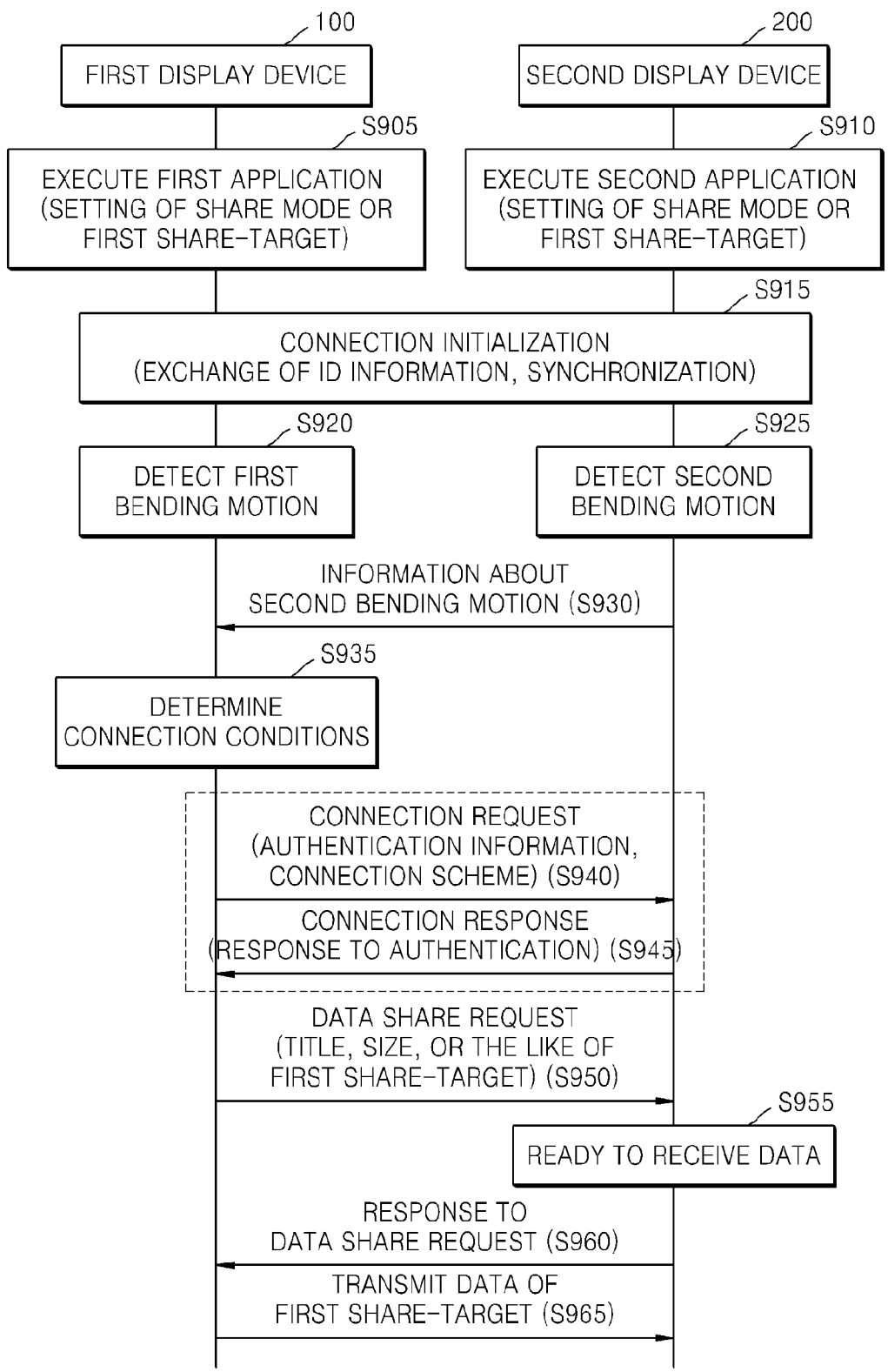

METHOD OF ESTABLISHING COMMUNICATION LINK AND DISPLAY DEVICES THEREOF

CROSS-REFERENCE TO RELATED PATENT APPLICATION

This application claims the benefit of Korean Patent Application No. 10-2012-0092540, filed on Aug. 23, 2012, in the Korean Intellectual Property Office, the disclosure of which is incorporated herein in its entirety by reference.

BACKGROUND

1. Field

The exemplary embodiments relate to a method of establishing a communication link between display devices by detecting a bending motion, and display devices thereof.

2. Description of the Related Art

As display-related technologies are developed, flexible displays, transparent display panels, or the like are being developed. A flexible display is a display device that can be bent.

The flexible display is formed by replacing a glass substrate with a plastic film, wherein the glass substrate generally surrounds liquid crystals in a liquid crystal display (LCD) and an organic light-emitting display. The flexible display may have flexibility so that it may be folded and unfolded. Since the flexible display is not formed by using the conventional glass substrate, but is formed by using a plastic substrate, a low-temperature manufacturing method, instead of the conventional manufacturing method, may be used to prevent a substrate from being damaged during its manufacture.

The flexible display is thin, light weight, and shock-resistant. Also, the flexible display may be curved or bent and may be manufactured in various forms. In particular, the flexible display may be applied to industrial fields to which glass-substrate displays related to the art are of limited application or cannot be applied.

For example, the flexible display may be applied to electronic books that may replace publications including magazines, textbooks, comic books, or the like, and new portable information technology (IT) products that include an ultra-small personal computer (PC) that may be carried while its display is folded or rolled, a smart card allowing real-time information confirmation, or the like. Since the flexible display is formed of a flexible plastic substrate, the applicable fields of the flexible display may be expanded to fashionable clothing and medical diagnosis.

SUMMARY

The exemplary embodiments provide a method of establishing a communication link between display devices by detecting a simple bending motion, and sharing content between the display devices via the communication link, and the display devices thereof.

According to an aspect, there is provided a method of establishing, by a first display device, a communication link with a second display device, the method including operations of detecting a first bending motion occurring in the first display device; obtaining information about a second bending motion occurring in the second display device; and establishing a communication link for a data exchange with the second display device, based on a start time of the first bending motion and a start time of the second bending motion.

The operation of establishing the communication link may be performed when a difference between the start time of the first bending motion and the start time of the second bending motion is less than a predetermined threshold value.

The operation of establishing the communication link may include an operation of establishing the communication link by further referring to pattern information of the first bending motion and pattern information of the second bending motion.

The operation of establishing the communication link may include an operation of establishing the communication link by further referring to a distance difference between the first display device and the second display device.

The operation of establishing the communication link may include an operation of establishing the communication link by further referring to correspondence between the first bending motion and the second bending motion.

The operation of establishing the communication link may include an operation of determining the correspondence between the first bending motion and the second bending motion, based on at least one of a bent position, a bending direction, a degree of bending, a bending strength, a bending speed, a total number of times, a start time, and an elapsed-time that are of each of the first bending motion and the second bending motion.

The operation of establishing the communication link may be performed when a difference between the first bending motion and the second bending motion is within a predetermined range.

The operation of establishing the communication link may be performed when the first bending motion and the second bending motion are symmetrical to each other with respect to a predetermined axis.

The communication link may include at least one of a wireless local area network (LAN), near field communication (NFC), Bluetooth, ZigBee, Wi-Fi Direct (WFD), and Ultra Wide Band (UWB).

The operation of establishing the communication link may further include operations of displaying a confirm request message about whether to establish the communication link between the first display device and the second display device; and receiving, from a user, confirmation with respect to the establishment of the communication link.

The operation of establishing the communication link may further include an operation of displaying an image so as to guide the first bending motion for establishment of the communication link.

The operation of establishing the communication link may further include operations of receiving, from a user, selection with respect to at least one piece of content; and transmitting the at least one piece of content to the second display device via the communication link.

The operation of establishing the communication link may further include an operation of obtaining arrangement status information with respect to the first display device and the second display device.

The operation of obtaining the arrangement status information may include an operation of obtaining the arrangement status information by using at least one of a tactile sensor, a proximity sensor, an illuminance sensor, an NFC tag, and a radio frequency identification (RFID) tag.

The operation of establishing the communication link may further include an operation of determining one of the first display device and the second display device, as a master device.

The operation of determining the master device may be performed based on at least one of a bent position, a bending direction, a degree of bending, a bending strength, a bending speed, a total number of times, a start time, and an elapsed-time that are of each of the first bending motion and the second bending motion.

The operation of establishing the communication link may further include operations of detecting a third bending motion occurring in the first display device, or receiving information about a fourth bending motion that occurs in the second display device; and disconnecting the communication link, based on the third bending motion or the fourth bending motion.

The operation of disconnecting the communication link may be performed when a difference between the first bending motion and one of the third bending motion and the fourth bending motion is within a predetermined range.

The operation of disconnecting the communication link may be performed when the first bending motion and one of the third bending motion and the fourth bending motion are symmetrical to each other with respect to a predetermined axis.

According to another aspect, there is provided a first display device including a sensing unit for detecting a first bending motion occurring in the first display device; a communication unit for obtaining information about a second bending motion occurring in the second display device; and a control unit for establishing a communication link for a data exchange with the second display device, based on a start time of the first bending motion and a start time of the second bending motion.

The control unit may establish the communication link when a difference between the start time of the first bending motion and the start time of the second bending motion is less than a predetermined threshold value.

The control unit may establish the communication link by further referring to pattern information of the first bending motion and pattern information of the second bending motion.

The control unit may establish the communication link by further referring to a distance difference between the first display device and the second display device.

The control unit may establish the communication link by further referring to correspondence between the first bending motion and the second bending motion.

The control unit may determine the correspondence between the first bending motion and the second bending motion, based on at least one of a bent position, a bending direction, a degree of bending, a bending strength, a bending speed, a total number of times, a start time, and an elapsed-time that are of each of the first bending motion and the second bending motion.

The communication link may include at least one of a wireless local area network (LAN), near field communication (NFC), Bluetooth, ZigBee, Wi-Fi Direct (WFD), and Ultra Wide Band (UWB).

The first display device may further include a display unit for displaying a confirm request message about whether to establish the communication link between the first display device and the second display device.

The first display device may further include a display unit for displaying an image so as to guide the first bending motion for establishment of the communication link.

The sensing unit may detect a user's selection with respect to at least one piece of content, and the communication unit may transmit the at least one piece of content to the second display device via the communication link.

The control unit may obtain arrangement status information with respect to the first display device and the second display device.

The control unit may obtain the arrangement status information by using at least one of a tactile sensor, a proximity sensor, an illuminance sensor, an NFC tag, and a radio frequency identification (RFID) tag.

According to another aspect, there is provided a method of establishing, by a server, a communication link between a first display device and a second display device, the method including operations of obtaining information about a first bending motion occurring in the first display device; obtaining information about a second bending motion occurring in the second display device; and transmitting communication connection information to the first display device and the second display device based on a start time of the first bending motion and a start time of the second bending motion, wherein the communication connection information is required to establish the communication link between the first display device and the second display device.

The operation of transmitting the communication connection information may include an operation of transmitting the communication connection information by further referring to pattern information of the first bending motion and pattern information of the second bending motion.

The operation of transmitting the communication connection information may include an operation of transmitting the communication connection information by further referring to a distance difference between the first display device and the second display device.

The operation of transmitting the communication connection information may include an operation of transmitting the communication connection information by further referring to correspondence between the first bending motion and the second bending motion.

The operation of transmitting the communication connection information may include operations of transmitting identification (ID) information of the second display device, communication connection scheme information, and first authentication information to the first display device; and transmitting ID information of the first display device, the communication connection scheme information, and second authentication information to the second display device.

The method may further include an operation of determining one of the first display device and the second display device, as a master device.

The operation of determining the master device may be performed based on at least one of a bent position, a bending direction, a degree of bending, a bending strength, a bending speed, a total number of times, a start time, and an elapsed-time that are of each of the first bending motion and the second bending motion.

In one exemplary embodiment, there is a method of communication between a first device and a second device, the method including: detecting a first fold in the first device; detecting a second fold in the second device; and starting a communication link between the first device and the second device based on the first and the second folds.

The starting the communication link may include starting the communication link when the second fold is detected at substantially at a same time the first fold is detected or when the second fold is detected within a preset amount of time after the first fold is detected.

The starting the communication link may include comparing a geometry of the first fold with a geometry of the second fold or comparing a folding motion of the first fold with a folding motion of the second fold.

BRIEF DESCRIPTION OF THE DRAWINGS

The above and other features of the exemplary embodiments will become more apparent by describing in detail exemplary embodiments thereof with reference to the attached drawings in which:

FIG. 9 is a flowchart of a method of sharing data between the first display device and the second display device, according to an exemplary embodiment;

DETAILED DESCRIPTION

Figure 1:
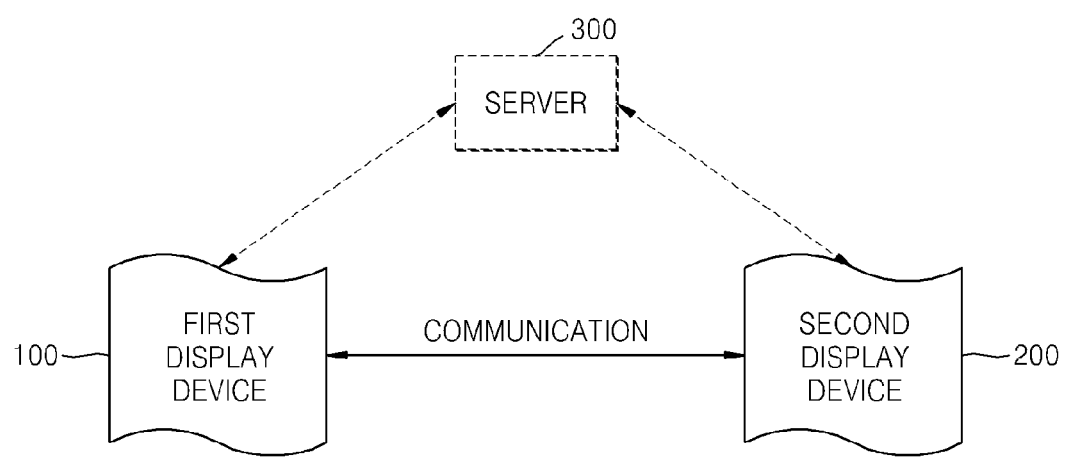
FIG. 1 is a block diagram illustrating a communication system according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "bending", e.g., folding, means that a display device is bent, e.g., folded, due to an external force. Also, throughout the specification, the term "bending motion", e.g., folding motion, means a motion that bends, e.g., folds, the display device. In one or more exemplary embodiments, the bending motion may vary. For example, the bending motion may collectively refer to all motions including a folding gesture, a rolling gesture, a shaking gesture, a bending gesture, or the like that make the display device be bent by a user.

One or more exemplary embodiments will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the invention to those of ordinary skill in the art. In the following description, well-known functions or constructions are not described in detail since they would obscure the invention with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating a communication system according to an exemplary embodiment.

As illustrated in FIG. 1, the communication system may include a first display device 100 and a second display device 200. The first display device 100 and the second display device 200 may display predetermined content and may be bent. That is, in the present exemplary embodiment, the first display device 100 and the second display device 200 may be flexible display devices.

The first display device 100 and the second display device 200 may have various forms. Each of the first display device 100 and the second display device 200 may be various types of a display device including a display panel. For example, the first display device 100 and the second display device 200 in the present exemplary embodiment may be a mobile phone, a smart phone, a laptop computer, a tablet personal computer (PC), an electronic book terminal, a smart television (smart TV), a terminal for digital broadcasting, a personal digital assistant (PDA), a portable multimedia player (PMP), a navigation device, or the like.

In the present exemplary embodiment, the first display device 100 and the second display device 200 may mutually communicate with each other in a wired or wireless manner. Also, the first display device 100 and the second display device 200 may mutually perform short-range wireless communication. An example of the short-range wireless communication may be, but is not limited to, a wireless LAN (Wi-Fi), near field communication (NFC), Bluetooth, ZigBee, Wi-Fi Direct (WFD), Ultra Wide Band (UWB), or the like.

Bluetooth is a standard technology for wireless communication devices that perform wireless communication therebetween within a short range, by using low power. UWB is a wireless communication technology used to transmit a large amount of data in a short period via a large spectrum frequency, by using low power.

NFC is related to short-range wireless communication by connecting devices that are near to each other using magnetic field induction, and communication may be performed in every direction. WFD is a new version of Wi-Fi technology and is mainly characterized in that it incorporates direct communication between devices. That is, although there is not a hotspot, a router, or an access point (AP), if the devices use WFD, the devices may communicate with each other and thus may share information therebetween. Also, unlike Bluetooth, WFD does not require a pairing procedure, may perform long-distance communication within a maximum distance of 200 m, and may perform 1:N communication with several devices.

ZigBee is one of the IEEE 802.15.4 standards that support short-range wireless communication. ZigBee is a technology for short-range wireless communication within a distance of 10-20 m and ubiquitous computing in a wireless networking environment such as one that is established in a house or an office.

Wireless LAN (Wi-Fi) may include an infrastructure mode in which an access point (AP) that transmits a wireless signal according to a device type or a usage mode exchanges data with a plurality of terminals (e.g., a PC, or the like) within a predetermined range around the AP, and an ad-hoc mode in which terminals mutually exchange data in a peer-to-peer (P2P) way without the AP.

Figure 2:
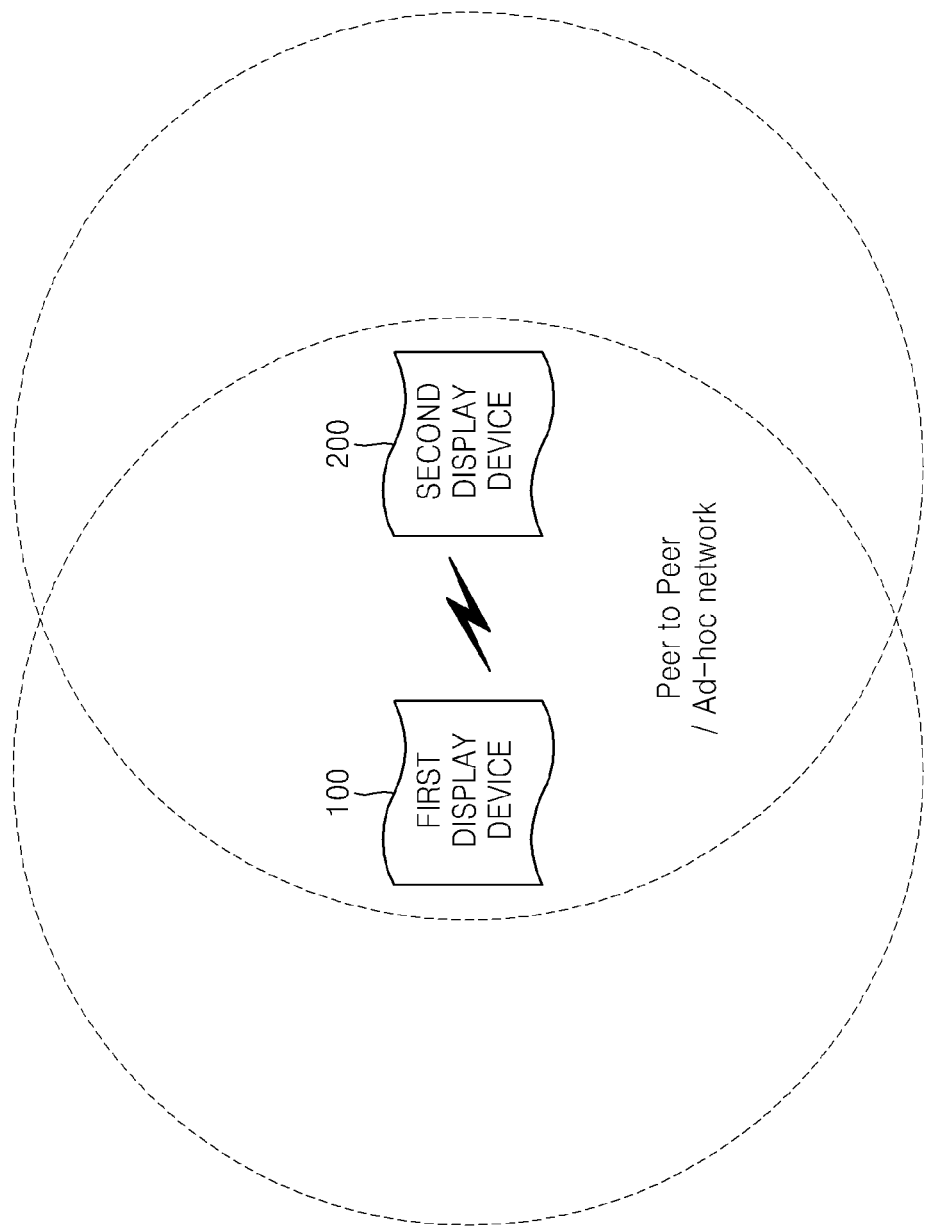
FIGS. 2 and 3 illustrate a method of performing communication between a first display device and a second display device, according to an exemplary embodiment.

For example, as illustrated in FIG. 2, the first display device 100 and the second display device 200 may transceive data in an ad-hoc way without the AP.

Figure 3:
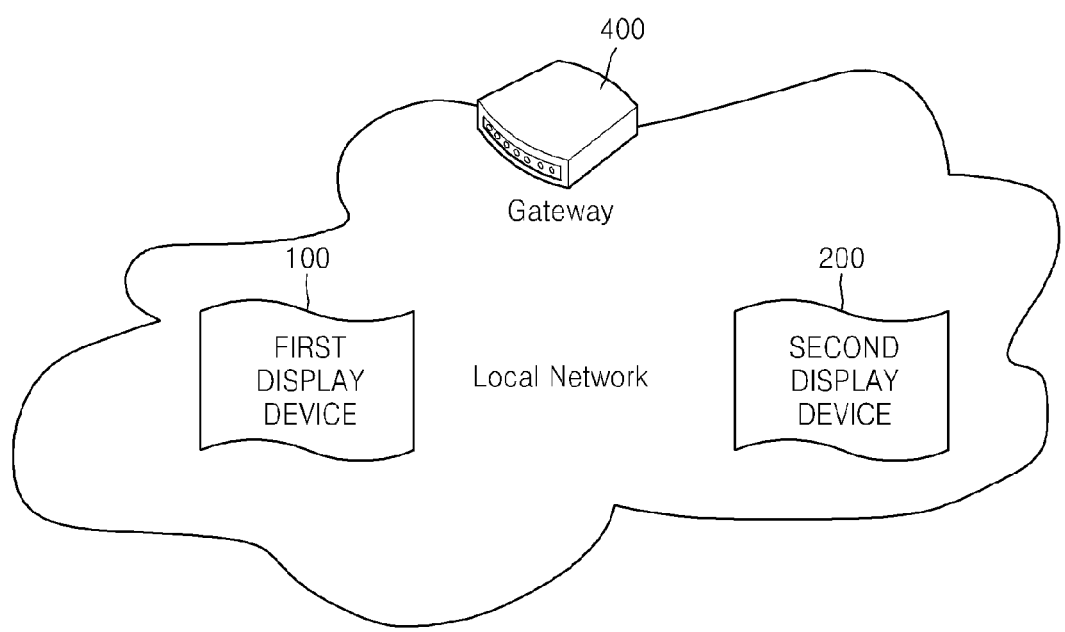

Also, as illustrated in FIG. 3, the first display device 100 and the second display device 200 may transceive data via a gateway 400. That is, the first display device 100 and the second display device 200 may transceive data within an infrastructure. Here, the gateway 400 may be the AP.

In the present exemplary embodiment, the first display device 100 and the second display device 200 may perform wired or wireless communication with a server 300. The first display device 100 and the second display device 200 may transmit content to the server 300 or may receive content from the server 300. Also, the first display device 100 and the second display device 200 may transmit information about a bending motion. This will be described in detail with reference to FIGS. 17 through 21.

In the present exemplary embodiment, the first display device 100 may be a transmission device that establishes a communication link with an external device and then transmits content, and the second display device 200 may be a reception device that receives content from an external device.

The first display device 100 may detect a first bending motion of a user that bends the first display device 100 and may receive information about a second bending motion of the second display device 200 from the second display device 200. Also, the first display device 100 may compare the first bending motion and the second bending motion and then may establish a communication link. A structure of the first display device 100 will be described in detail with reference to FIG. 4.

The second display device 200 may detect a second bending motion that is input by a user. Then, the second display device 200 may transmit information about the second bending motion to the first display device 100. Here, the second display device 200 may directly transmit the information about the second bending motion to the first display device 100, or may transmit the information about the second bending motion to the first display device 100 via the server 300.

Also, the second display device 200 may receive content from the first display device 100 or the server 300 and may display the content.

Hereinafter, a structure of the first display device 100 that establishes a communication link according to a bending motion is described in detail with reference to FIG. 4.

Figure 4:
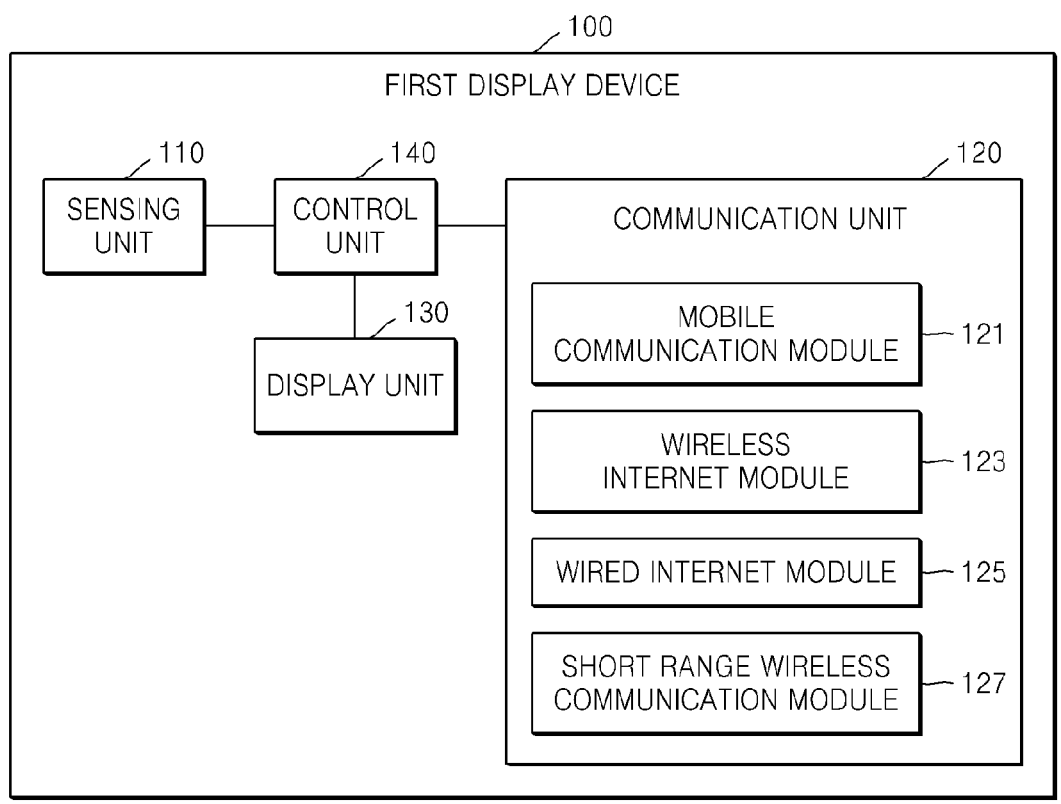
FIG. 4 is a block diagram illustrating the first display device, according to an exemplary embodiment.

FIG. 4 is a block diagram illustrating the first display device 100, according to an exemplary embodiment.

As illustrated in FIG. 4, the first display device 100 may include a sensing unit 110, a communication unit 120, a display unit 130, and a control unit 140. However, not all shown elements are necessary elements. That is, the first display device 100 may be embodied with more or less elements than the shown elements.

Hereinafter, the shown elements are described.

The sensing unit 110 may detect a first bending motion or a first bent state of the first display device 100. Hereinafter, the description in the present and other exemplary embodiments will be limited to bending motions but all the exemplary embodiments are equally applicable in detecting the bent states of display devices and subsequent operations based on the bent states. According to the present exemplary embodiment, a plurality of bending sensors may be arranged in the first display device 100 or near the first display device 100 so as to detect the first bending motion. The sensing unit 110 may collect a plurality of pieces of information about the first bending motion from the bending sensors and may analyze the plurality of pieces of information, so that the sensing unit 110 may detect the first bending motion.

Regarding the first bending motion, the sensing unit 110 may obtain the plurality of pieces of information about a bent position (i.e., a coordinates-value), a bending direction, a degree of bending, a bending strength, a bending speed, a total number of times the first bending motion occurs, and a start time of the first bending motion.

For example, the sensing unit 110 may obtain the information about the bent position and the information about the bending direction, by using information indicating that a pressure at a bent portion is different from a pressure at a non-bent portion. Also, the sensing unit 110 may obtain the information about the degree of bending, a bending radius, the total number of times the bending motion occurs, the bending speed, or the like, based on a variation in power at the bent portion. Alternatively, the sensing unit 110 may measure a deformation speed of each portion by using an acceleration sensor and may connect positions having a large speed variation, so that the sensing unit 110 may obtain the information about the bent position and the degree of bending.

That is, the sensing unit 110 may detect the first bending motion by using a bending sensor, an acceleration sensor, a tilt sensor, a gyro sensor, a 3-axis magnetic sensor, or the like.

Also, the sensing unit 110 may collect sensed data by using a touch sensor, a pressure sensor, a tactile sensor, an illuminance sensor, a proximity sensor, a radio frequency identification (RFID) reader, or an RFID tag, so as to obtain arrangement status information with respect to the first display device 100 and the second display device 200. Here, the arrangement status information may include information about whether the first display device 100 and the second display device 200 are stacked, or information about how the first display device 100 and the second display device 200 are disposed in a vertical direction or in a horizontal direction.

According to the present exemplary embodiment, in order to obtain the arrangement status information, the sensing unit 110 may detect a touch by the second display device 200 on a detection surface (e.g., a screen of the display unit 130), by using the touch sensor, the pressure sensor, or the like.

Here, the touch may be an actual touch by which the second display device 200 actually touches the first display device 100, or a proximity-touch by which the second display device 200 does not actually touch the first display device 100 but approaches the first display device 100 within a predetermined distance. According to the present exemplary embodiment, in order to obtain the arrangement status information, the sensing unit 110 may detect whether a specific object is placed on the detection surface (e.g., the screen of the display unit 130), by using the tactile sensor. The tactile sensor detects a contact of the specific object (e.g., the second display device 200) with a sensitivity close to that of a human touch. The tactile sensor may detect various types of information such as roughness of a contact surface, hardness of the contact object, temperature of a contact point, or the like.

According to the present exemplary embodiment, in order to obtain the arrangement status information, the sensing unit 110 may detect whether the specific object (e.g., the second display device 200) approaches in a sensing direction (e.g., in a direction toward the screen of the display unit 130), by using the proximity sensor. The proximity sensor detects existence of an object that approaches a predetermined detection surface or that exists nearby, by using a force of an electro-magnetic field or an infrared ray. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like.

An operational principle of the high frequency oscillation-type proximity sensor from among the proximity sensors is now described. While an oscillation circuit of the high frequency oscillation-type proximity sensor oscillates at a normal high frequency, when a detection target object approaches near a detection surface of the high frequency oscillation-type proximity sensor, an oscillation amplitude of the oscillation circuit decreases or stops, and then this change in oscillation amplitude is converted into an electrical signal, so that the high frequency oscillation-type proximity sensor detects existence of the detection target object. Thus, although any material other than a metal material may be disposed between the high frequency oscillation-type proximity sensor and the detection target object, a proximity switch of the high frequency oscillation-type proximity sensor may detect the detection target object without intervention of the material.

For example, the sensing unit 110 may detect a proximity or a proximity pattern (e.g., a proximity distance, a proximity direction, a proximity time, a proximity position, a proximity movement status, or the like) between the specific object and the proximity sensor by using the proximity sensor, and may transmit the proximity pattern, as the arrangement status information, to the control unit 140. Also, the control unit 140 may compare a threshold value of the proximity distance with the proximity distance that is received from the sensing unit 110 and that is between the specific object and the proximity sensor, and when the proximity distance between the specific object and the proximity sensor is less than the threshold value, the control unit 140 may determine that the specific object approaches in the sensing direction.

According to the present exemplary embodiment, in order to obtain the arrangement status information, the sensing unit 110 may detect whether the specific object (e.g., the second display device 200) approaches in the sensing direction (e.g., in a direction toward the screen of the display unit 130), by using the illuminance sensor. The illuminance sensor may generate illuminance signals having various levels according to an ambient illuminance (i.e., a level of an intensity of light or a level of brightness or darkness of light). For example, the illuminance sensor may detect an illuminance in a direction toward the screen of the display unit 130.

In the present exemplary embodiment, when the second display device 200 approaches and then is positioned above the display unit 130 of the first display device 100, the sensing unit 110 may detect an illuminance change by using the illuminance sensor and then may transmit data about an illuminance value, a detection time, or the like to the control unit 140. The control unit 140 may compare the illuminance value, which is received from the sensing unit 110, with an illuminance value that is received from the second display device 200, and then may determine whether the second display device 200 is positioned in the direction toward the screen of the display unit 130.

In the present exemplary embodiment, the sensing unit 110 may detect a user selection with respect to at least one piece of content.

The communication unit 120 may include one or more elements for communication with the second display device 200 or the server 300. For example, the communication unit 120 may include a mobile communication module 121, a wireless internet module 123, a wired internet module 125, a short-range wireless communication module 127, or the like.

The mobile communication module 121 exchanges a wireless signal with at least one of a base station, an external terminal, and a server in a mobile communication network. The wireless internet module 123 is a module for connection to wireless internet and may be arranged inside or outside the first display device 100. The wired internet module 125 is a module for connection to wired internet.

The short-range wireless communication module 127 is for short-range wireless communication. Examples of the short-range wireless communication may include, but are not limited to, Bluetooth, UWB, ZigBee, NFC, WFD, infrared Data Association (IrDA), or the like.

The communication unit 120 may obtain information about a second bending motion of the second display device 200. The information about the second bending motion may include a plurality of pieces of information about a bent position (i.e., a coordinates-value), a bending direction, a degree of bending, a bending strength, a bending speed, a total number of times the second bending motion occurs, a start time of the second bending motion, an elapsed-time of the second bending motion, and a bending pattern.

The communication unit 120 may transmit the at least one piece of content, which is selected by a user, to the second display device 200 via a communication link.

In the present exemplary embodiment, a communication link used to obtain the information about the second bending motion may be different from the communication link for transmission of content. For example, the communication unit 120 may obtain the information about the second bending motion via NFC, and may transmit the content via wireless internet communication.

The communication unit 120 may transmit information about the first bending motion, predetermined content, or position information of the first display device 100 to the server 300. Also, the communication unit 120 may receive information about the second display device 200 and a content (i.e., share-target) request message from the server 300.

In the present exemplary embodiment, the communication unit 120 may exchange content with the second display device 200 according to the Digital Living Network Alliance (DLNA) specification. Examples of devices that are defined in the DLNA specification may include a digital media server (DMS) that provides content, a digital media renderer (DMR) that renders content, and a digital media controller (DMC) that searches for content provided by the DMS and then sets up connection between the DMS and the DMR by matching the searched content with a rendering capability of the DMR.

The DLNA specification selects the Universal Plug and Play (UPnP) specification so as to discover and control the devices. The UPnP specification specifies technology that enables networking, particularly, home networking between network devices such as various electronic products, a network printer, an internet gate, or the like, by extending a Plug and Play function, which allows a PC to automatically detect peripheral devices, to an entire network, based on an internet standard technology such as transmission control protocol/internet protocol (TCP/IP), a hypertext transfer protocol (HTTP), an extensible markup language (XML), or the like.

An UPnP network is formed of an UPnP control device (CD) that is connected to an IP-based home network and then is controlled; and an UPnP control point (CP) that controls the UPnP CD. The UPnP CD and the UPnP CP perform communication by using an UPnP protocol stack structure including internet protocols such as TCP/IP, HTTP, or the like, and technologies such as the XML, a simple object access protocol (SOAP), or the like. The UPnP CP performs control by transmitting an UPnP control request to the UPnP CD.

Figure 5:
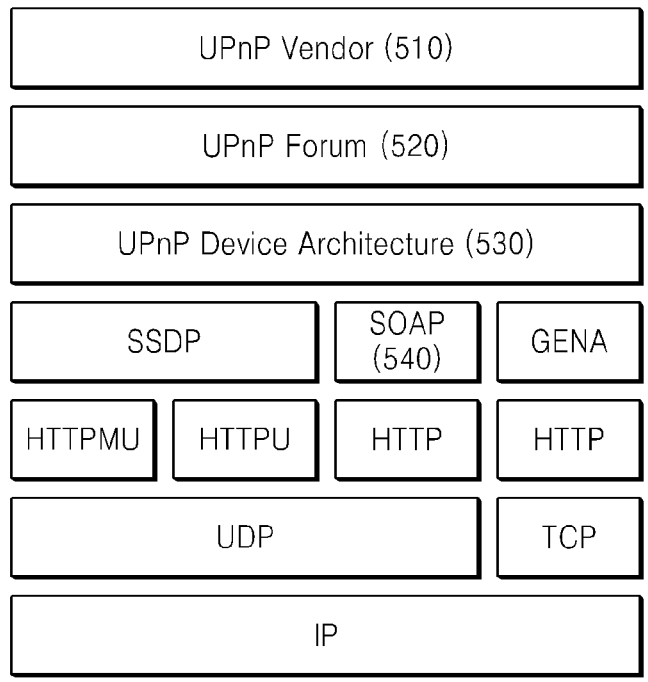
FIG. 5 illustrates a Universal Plug and Play (UPnP) protocol stack, according to an exemplary embodiment.

FIG. 5 illustrates an UPnP protocol stack, according to an exemplary embodiment.

An UPnP vendor 510 is a protocol for extending a function of an UPnP. An UPnP forum 520 provides a device control protocol (DCP). An UPnP Device Architecture 530 corresponds to a core of the UPnP.

The UPnP CD and the UPnP CP perform communication by using a control protocol that is referred to as an SOAP 540.

That is, when a CP discovers a CD that is connected to a network, and receives a detailed description about a device and a service from the CD, the CP is prepared to control the CD. Here, the CP may control the CD by calling an action that executes a particular service of the CD. The action in an UPnP environment may be generated by an XML and may be transmitted by using a SOAP communication specification.

In the present exemplary embodiment, the first display device 100 may function as the CP, and the second display device 200 may function as the CD. Alternatively, the second display device 200 may function as the CP, and the first display device 100 may function as the CD.

Figure 6:
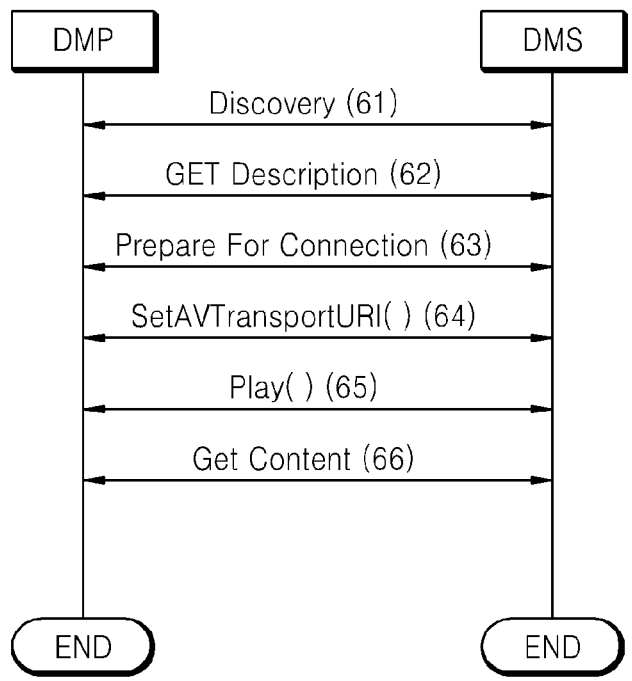
FIG. 6 is a flowchart illustrating the Digital Living Network Alliance (DLNA) specification, according to an exemplary embodiment.

FIG. 6 is a flowchart illustrating the DLNA specification, according to an exemplary embodiment.

In operation 61, a digital media player (DMP) searches for UPnP devices via operations in an UPnP device architecture (DA) and then discovers a DMS.

In operation 62, the DMP may request a description from the discovered DMS and then may receive the description from the DMS. Here, the DMP may check a content list and content information of the DMS via CDS:Browse/Search( ). The content information may include an ID, a title, a generation date, a type, an access uniform resource identifier (URI), or the like that are related to content. The DMP may display the content list to a user via a UI.

In operation 63, the DMP may set information by using a PrepareForConnection action of a connection manager of the DMS. A set message may be generated by using an XML and may include protocol information that is formed according to a SOAP format, an ID of the connection manager, a connection ID, and information about a transmission direction of the content. A response from the DMS may include a service instance ID of the connection manager, an AV transport service instance ID, and an RCS service ID.

For example, the DMS may recognize, via the PrepareForConnection action, that a transmission protocol is an HTTP-GET protocol, a content format is an MPEG2-TS format, the ID of the connection manager is 0, and the transmission direction is INPUT.

In operation 64, the DMP may notify the DMS about target reproduction content. The DMP may notify the DMS about the target reproduction content by using a SetAVTransportURI action of an AV transport service of the DMS.

As in the PrepareForConnection, SetAVTransportURI may be generated by using an XML and may be formed according to the SOAP format. That is, SetAVTransportURI may include a URI of an XML document including a virtual instance ID of the AV Transport service, a URI of content, and metadata information of the content.

In operation 65, the DMP may prepare reproduction of the content by using the PrepareForConnection action and the SetAVTransportURI action and then may transmit a Play action to the DMS.

In operation 66, the DMP may obtain and reproduce the content. When a reproduction method corresponds to a push method, the DMS transmits selected content to the DMP, and then the DMP receives and reproduces the selected content. When a reproduction method is a pull method, the DMP accesses the DMS, requests corresponding content, receives the corresponding content from the DMS, and then reproduces the corresponding content.

Referring back to FIG. 4, the display unit 130 may display and output information that is processed by the first display device 100. For example, the display unit 130 may display predetermined content or a content list. When the display unit 130 and a touchpad form a layer structure, and thus are formed as a touch screen, the display unit 130 may be used as both an output device and an input device.

The display unit 130 may be at least one of a liquid crystal display (LCD), a thin film transistor-liquid crystal display (TFT-LCD), an organic light-emitting display device, a flexible display, a 3D display, and an electrophoretic display.

Also, according to a type of the first display device 100, at least two display units 130 may be available. The touch screen may be formed to detect a position of a touch input, a touched area, and a touch input pressure. Also, the touch screen may detect not only an actual touch but also may detect a proximity-touch.

In the present specification, a pointer indicates an instrument that is used to touch or to proximately touch a specific portion of a displayed screen. Examples of the pointer include an electronic pen, a finger, and the like.

The display unit 130 may display a confirm request message regarding whether to establish a communication link between the first display device 100 and the second display device 200, based on a result of determining correspondence between the first bending motion and the second bending motion. By doing so, it is possible to prevent the establishment of a communication link or the sharing of data between the first display device 100 and the second display device 200 according to a bending motion that is not desired by a user.

The display unit 130 may display an image so as to guide the first bending motion for establishment of a communication link. The image for guidance of the first bending motion may display a bent position (line), a bending direction, a degree of bending, a total number of times the first bending motion occurs, or the like.

The control unit 140 may establish a communication link for an exchange of data with the second display device 200, based on a start time of the first bending motion and a start time of the second bending motion. Here, according to the present exemplary embodiment, the control unit 140 may establish the communication link in further consideration of at least one of correspondence between pattern information of the first bending motion and pattern information of the second bending motion, a distance difference between the first display device 100 and the second display device 200, and correspondence between the first bending motion and the second bending motion.

The control unit 140 may determine the correspondence between the first bending motion and the second bending motion, based on a bent position, a bending direction, a degree of bending, a bending strength, a bending speed, a total number of times each bending motion occurs, a start time of each bending motion, an elapsed-time of each bending motion, and a bending pattern that are related to each of the first bending motion and the second bending motion.

For example, when a difference between the first bending motion and the second bending motion is within a predetermined range, the control unit 140 may determine that the first bending motion and the second bending motion correspond to each other. Also, when the first bending motion and the second bending motion are symmetrical to each other with respect to a predetermined axis, the control unit 140 may determine that the first bending motion and the second bending motion correspond to each other.

Also, the control unit 140 may determine one of the first display device 100 and the second display device 200, as a master device. Here, the control unit 140 determines the master device based on at least one of the bent position, the bending direction, the degree of bending, the bending strength, the bending speed, the total number of times each bending motion occurs, and the start time of each bending motion that is related to each of the first bending motion and the second bending motion.

For example, the control unit 140 may determine a display device that is further frequently bent, as the master device, may determine a display device that is further previously bent, as the master device, may determine a display device that is bent in a predetermined direction, as the master device, may determine a display device that is bent by at least a predetermined degree, as the master device, or may determine a display device that is bent at a predetermined position, as the master device.

Here, a process in which the control unit 140 determines the master device or a slave device may be required to decide a body that determines the correspondence between the first bending motion and the second bending motion, a signal transmission order in a process of establishing a communication link, or a body to transmit content and the other body to receive the content.

However, the process in which the control unit 140 determines the master device or the slave device may be skipped. The first display device 100 and the second display device 200 may be designed so that neither functions as a master device or a slave device. Thus, when the first display device 100 and the second display device 200 use the same communication protocol or are included in the same network, the first display device 100 and the second display device 200 in the present exemplary embodiment may establish a communication link or may share content, without the process of deciding the master device or the slave device.

Also, the control unit 140 may compare the sensed data (the illuminance value, the proximity pattern, the proximity value, or the like), which is received from the sensing unit 110 of the first display device 100, with sensed data (an illuminance value, a proximity pattern, a proximity value, or the like) that is received from the second display device 200, so that the control unit 140 may obtain the arrangement status information with respect to the first display device 100 and the second display device 200.

For example, it is assumed that an illuminance sensor is positioned near a screen of a display device (i.e., at an upper part of the display device), and the second display device 200 is stacked below the first display device 100. In this case, when an illuminance value sensed by the first display device 100 is greater than an illuminance value sensed by the second display device 200, the control unit 140 may compare the illuminance value of the first display device 100 with the illuminance value of the second display device 200, and then may determine that the first display device 100 is disposed above the second display device 200.

The control unit 140 may disconnect the communication link, based on a third bending motion of the first display device 100 which is detected by the sensing unit 110, and information about a fourth bending motion of the second display device 200 which is obtained by the communication unit 120.

In the present exemplary embodiment, when a difference between the first bending motion and one of the third and fourth bending motions is within a predetermined range, the control unit 140 may disconnect the communication link.

In another exemplary embodiment, when the first bending motion and one of the third and fourth bending motions are symmetrical to each other with respect to a predetermined axis, the control unit 140 may disconnect the communication link.

When the first display device 100 is turned off, the control unit 140 may disconnect the communication link that is established with the second display device 200. When the first display device 100 is turned on, the control unit 140 may check a bent status of the second display device 200 and then may reconnect the communication link with the second display device 200. That is, when the first display device 100 is rebooted, if the correspondence between the first bending motion and the second bending motion is maintained, the control unit 140 may reconnect the communication link.

In the present exemplary embodiment, when a distance difference between the first display device 100 and the second display device 200 is equal to or greater than a predetermined value, the control unit 140 may disconnect the communication link with the second display device 200. When the distance difference between the distance of the first display device 100 and the distance of the second display device 200 is less than the predetermined value, the control unit 140 may re-establish the communication link based on whether the correspondence between the first bending motion and the second bending motion is maintained. That is, according to the present exemplary embodiment, the first display device 100 may maintain the communication link only when the second display device 200 is positioned within the predetermined distance from the first display device 100. Here, the predetermined distance may be a value that is previously set and that indicates a proximity distance between the first display device 100 and the second display device 200.

The control unit 140 may maintain the communication link only when the first display device 100 and the second display device 200 are included in the same communication network. For example, the control unit 140 maintain the communication link when the first display device 100 and the second display device 200 are serviced at the same Wi-Fi AP, and in this regard, when one of the first display device 100 and the second display device 200 is moved and then is served at another AP, the control unit 140 may disconnect the communication link.

Hereinafter, a method of easily establishing a communication link between display devices based on a bending motion will now be described with reference to FIG. 7.

Figure 7:
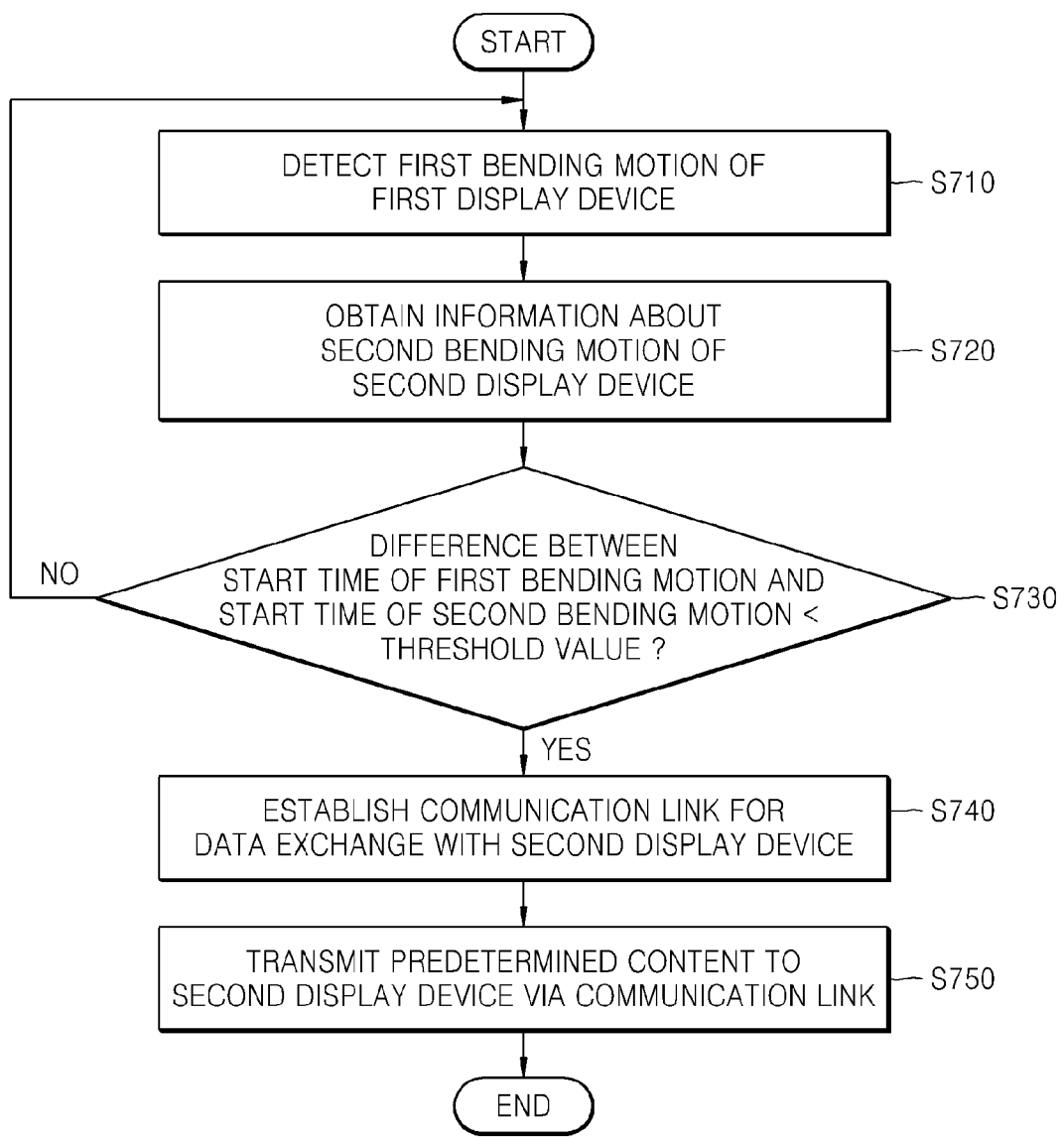
FIG. 7 is a flowchart of a method of establishing a communication link, according to an exemplary embodiment.

FIG. 7 is a flowchart of a method of establishing a communication link, according to an exemplary embodiment.

Referring to FIG. 7, the method according to the present exemplary embodiment includes operations that are processed in chronological order by the first display device 100 shown in FIG. 4. Thus, hereinafter, although the above descriptions of the first display device 100 shown in FIG. 4 are omitted, the descriptions may also be applied to the method of FIG. 7.

The first display device 100 may detect a first bending motion that is input by a user (operation S710). The first display device 100 is a flexible display device capable of being bent or rolled, and in this regard, a user may control the first display device 100 by bending the first display device 100.

The first display device 100 may detect the first bending motion by using various methods. The detection of the first bending motion is now described with reference to FIG. 10.

Figure 10A:
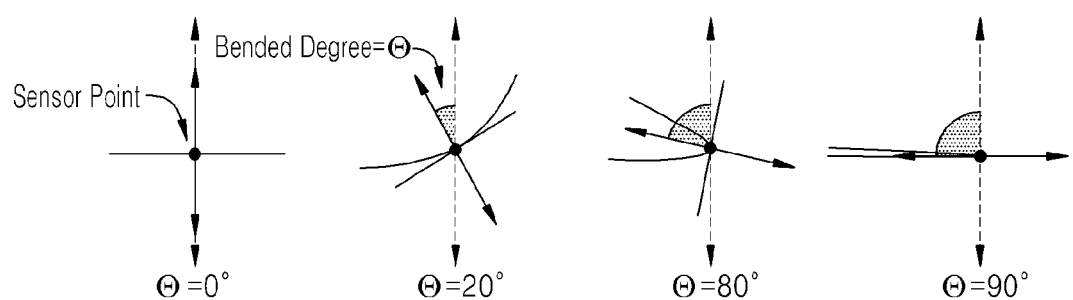
FIGS. 10A-10C illustrate a method of detecting a bending motion, according to an exemplary embodiment.
Figure 10B:
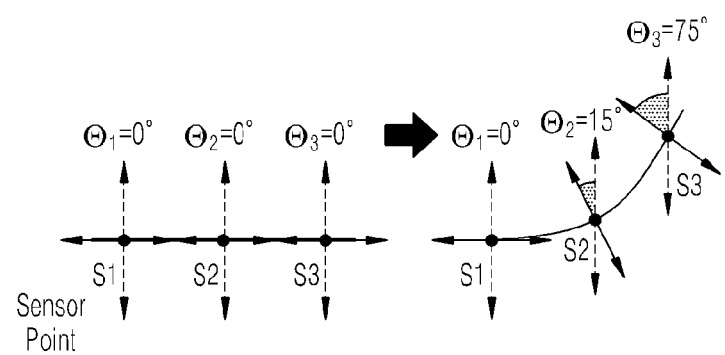
Figure 10C:
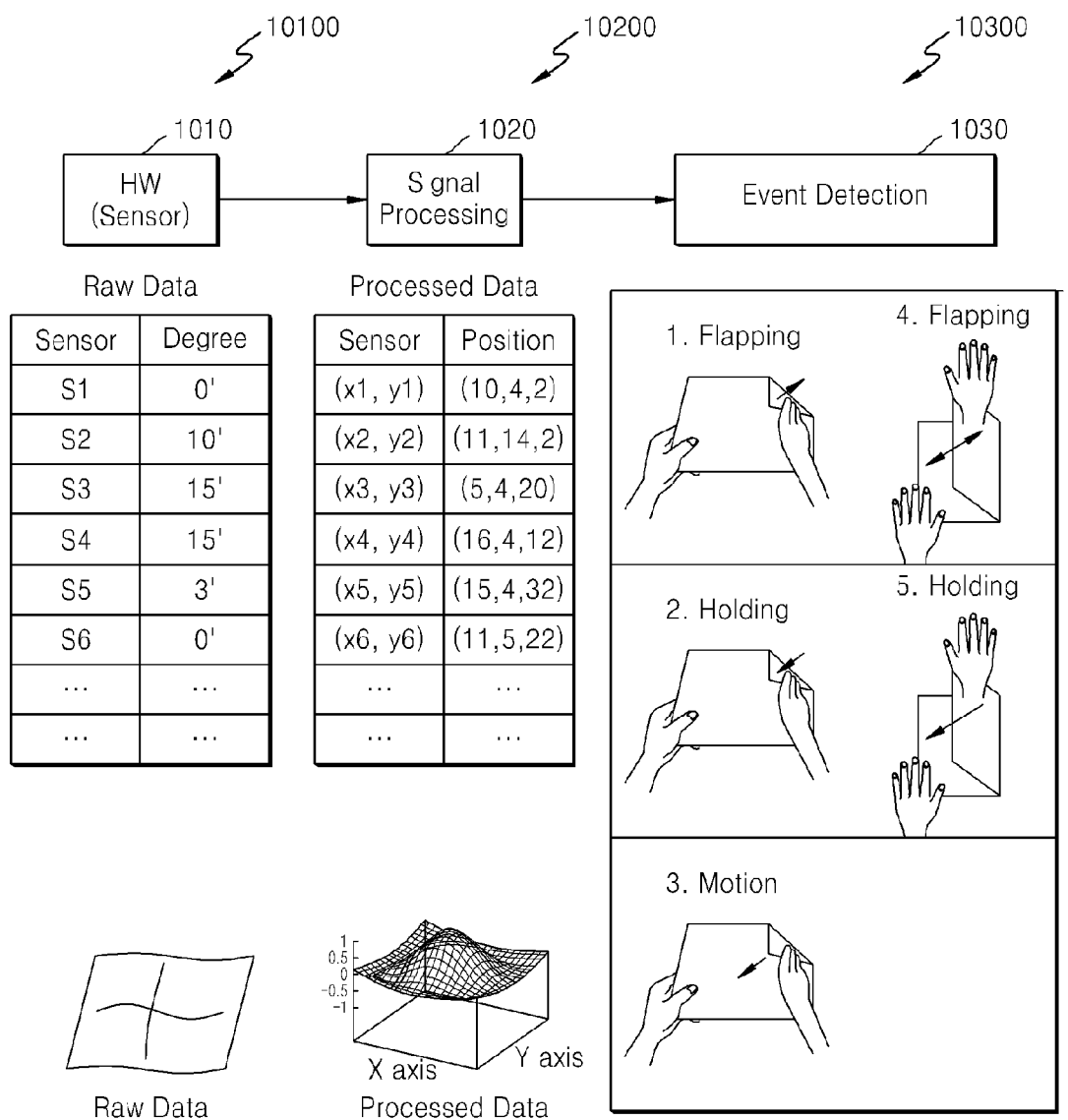

FIGS. 10A-C illustrate a method of detecting a bending motion, according to an exemplary embodiment.

In operation S1010, the first display device 100 may detect a bending motion by using various sensors. For example, the sensing unit 110 of the first display device 100 may collect a plurality of pieces of data related to the bending motion by using a bending sensor. That is, the sensing unit 110 of the first display device 100 may collect value variation of a sensing point at which the bending sensor or at least one sensing channel included in the bending sensor is positioned, by using the bending sensor.

For example, as illustrated in FIG. 10A, a bending sensor may detect a degree of bending at a sensing point. The bending sensor may detect a degree of bending between +180 through −180 degrees. Also, as illustrated in FIG. 10B, a plurality of bending sensors or a plurality of sensing channels included in each of the bending sensors that are disposed at regular intervals may detect degrees of bending at sensing points, respectively. Thus, an appropriate number of the bending sensors or an appropriate number of the sensing channels may be disposed at appropriate positions so as to accurately detect a deformed status of the first display device 100. A plurality of pieces of data about the degrees of bending that are collected at the sensing points may be used in analysing the deformed status of a surface of the first display device 100. In other exemplary embodiments, the bending may be a series of bends which include two or more bends so there may be one or more inflection points in the series of bends. For example, the bending may assume an "S" shape.

FIG. 10C illustrates the degrees of bending at sensing points which are collected via the bending sensors or the sensing channels included in each of the bending sensors. As illustrated through reference number 10100 in FIG. 10C, the sensing unit 110 may collect raw data about each degree of bending at each sensing point which is collected via each bending sensor or each sensing channel included in each bending sensor. For example, the sensing unit 110 may collect raw data in which a degree of bending at a first sensing point, which is collected via a first sensor S1, is '0 degrees', a degree of bending at a second sensing point, which is collected via a second sensor S2, is '10 degrees', and a degree of bending at a third sensing point, which is collected via a third sensor S3, is '15 degrees'.

In operation S1020, the sensing unit 110 may analyze the plurality of pieces of collected data related to the bending motion and then may obtain a two-dimensional (2D) or three-dimensional (3D) coordinates values that indicate a deformed status of the first display device 100. The sensing unit 110 may analyze a deformed status of a flat screen of the first display device 100 based on a spatial location of each bending sensor. For example, the sensing unit 110 may calculate data indicating the deformed status of the first display device 100, wherein the data includes Z-axis coordinates values indicating a deformation degree in a front or rear direction with respect to the flat display screen.

That is, as illustrated through reference number 10200 in FIG. 10C, the sensing unit 110 may deduce 3D coordinates values (X, Y, and Z axes) of each sensing point, based on each detected degree of bending at each bending sensor. For example, 3D coordinates values of the first sensing point which are deduced by the sensing unit 110 may be (10, 4, and 2), 3D coordinates values of the second sensing point may be (11, 14, and 2), and 3D coordinates values of the third sensing point may be (5, 4, and 20). In this regard, it is possible to recognize the deformed status of the flat display screen of the first display device 100 by connecting the respective 3D coordinates values of the respective sensing points.

In operation 1030, according to the present exemplary embodiment, the control unit 140 may analyze the deformed status of the flat display screen by using the sensed data (or the arrangement status information) received from the sensing unit 110, and may determine whether the first bending motion is mapped with a predetermined event. For example, as illustrated through reference number 10300 in FIG. 10C, when, as a result of the analysis of the sensed data (or the arrangement status information), it is determined that the first bending motion is a motion in which the bent first display device 100 is returned to its original form, the control unit 140 may recognize the first bending motion as a flapping motion. Also, when a bent status of the first display device 100 is maintained over a predetermined time period, the control unit 140 may recognize the first bending motion as a bending-holding motion, and when a bent line of the first display device 100 keeps moving in one direction, the control unit 140 may recognize the first bending motion as a motion-bending motion.

Also, the control unit 140 may map the first bending motion with a predefined event by referring to a position of a sensing point at which the first bending motion is detected. For example, when a center portion of the flat display screen of the first display device 100 is projected in a certain direction for more than a predetermined time period, the control unit 140 may map and recognize such a projecting status as a motion that is convexly bending the center portion of the first display device 100.

Also, when an edge of the first display device 100 is bent, the control unit 140 may map the first bending motion with an edge-bending motion and then may control an event to be provided, wherein the event is different from an event for the projecting center portion.

Figure 11:
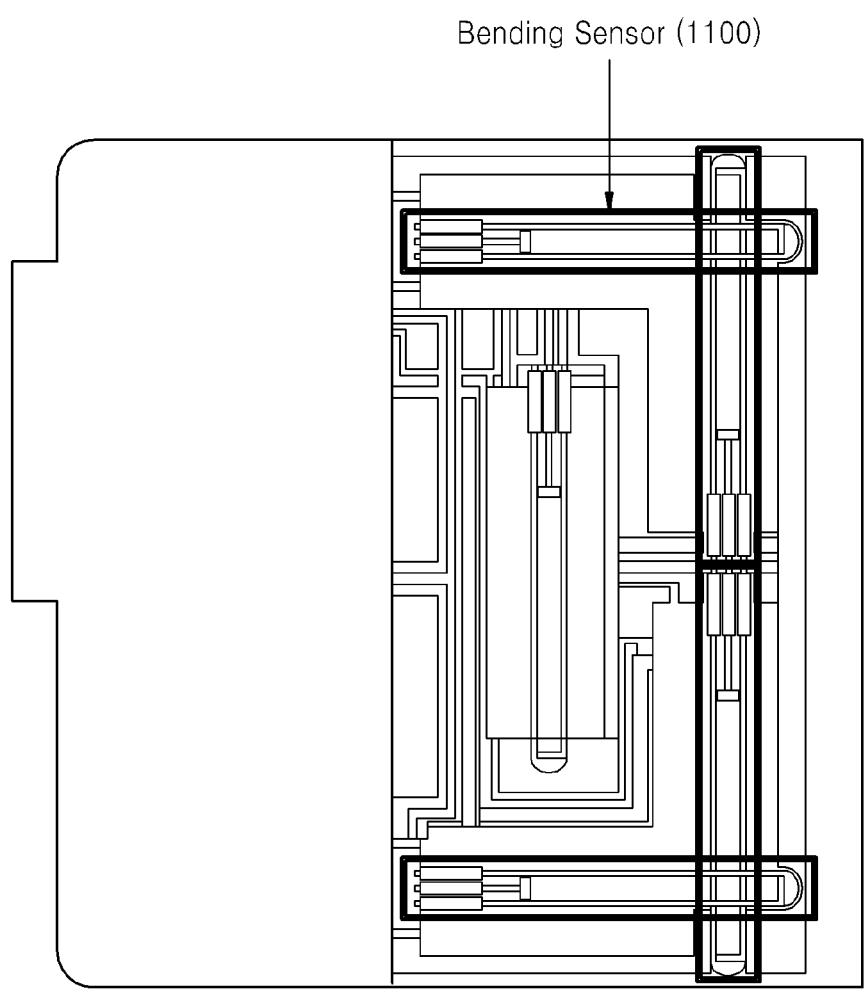
FIG. 11 illustrates a bending sensor, according to an exemplary embodiment.

FIG. 11 illustrates a bending sensor 1100, according to an exemplary embodiment. As illustrated in FIG. 11, the bending sensor 1100 may have a line-shape. The bending sensor 1100 may include a coil.

The bending sensor 1100 may detect an inductance variation due to a change of a current that flows in the coil. The sensing unit 110 may receive, from the bending sensor, a position and an inductance variation value of a bending sensor at which the inductance variation occurs.

The sensing unit 110 may deduce a bent line based on the position of the bending sensor, and may deduce a degree of bending based on the inductance variation value.

Also, the control unit 140 may map a user input bending motion with a predefined event and may recognize the predefined event, based on the bent line, the degree of bending, and the inductance variation value.

According to the present exemplary embodiment, a threshold value for determination of a bent status may vary according to an attribute of the first display device 100. Compared to a display device that is bent by a relatively small force, a threshold value for determination of a bent status of a display device that is bent by a relatively large force may be small.

According to the present exemplary embodiment, regarding the first bending motion, the first display device 100 may detect a bent position, a bending direction, a degree of bending, a bending strength, a bending speed, a total number of times the first bending motion occurs, a start time of the first bending motion, and an elapsed-time of the first bending motion.

Also, according to the present exemplary embodiment, the first display device 100 may detect a pattern of the first bending motion. For example, when a plurality of bending motions are sequentially performed, the first display device 100 may detect a pattern related to bent positions, a bending order, and a bent arrangement.

The first display device 100 may obtain information about a second bending motion of the second display device 200 (operation S720). According to the present exemplary embodiment, the first display device 100 may directly obtain the information about the second bending motion from the second display device 200 via wired or wireless communication, or may obtain the information about the second bending motion from the server 300.

In the present exemplary embodiment, the information about the second bending motion may include a plurality of pieces of information about a bent position, a bending direction, a degree of bending, a bending strength, a bending speed, a total number of times the second bending motion occurs, a start time of the second bending motion, an elapsed-time of the second bending motion, and a bending pattern.

The first display device 100 may determine whether a difference between the start time of the first bending motion and the start time of the second bending motion is less than a threshold value (operation S730). Also, the first display device 100 may further determine correspondence between pattern information of the first bending motion and pattern information of the second bending motion, whether a distance difference between the first display device 100 and the second display device 200 is less than a predetermined value, and correspondence between the first bending motion and the second bending motion. The first display device 100 may determine the correspondence between the first bending motion and the second bending motion by comparing the bent position, the bending direction, the degree of bending, the bending strength, the bending speed, the total number of times each bending motion occurs, and the elapsed-time of each bending motion that is related to each of the first bending motion and the second bending motion.

For example, when the first bending motion and the second bending motion are matched or are symmetrical to each other with respect to a predetermined axis, the first display device 100 may determine that the first bending motion and the second bending motion correspond to each other. A relation with respect to the correspondence between the first bending motion and the second bending motion may be previously defined.

The first display device 100 may establish a communication link so as to exchange data with the second display device 200, based on the start time of the first bending motion and the start time of the second bending motion (operation S740). That is, the first display device 100 may establish the communication link when the difference between the start time of the first bending motion and the start time of the second bending motion is less than a predetermined time. For example, when bending events almost simultaneously (or within a small time difference) occur in the first display device 100 and the second display device 200, the first display device 100 may perform a process of establishing the communication link with the second display device 200.

The first display device 100 may establish the communication link for the exchange of data with the second display device 200, by further referring to the pattern information of the first display device 100 and the pattern information of the second display device 200. For example, when the first bending motion involves sequentially bending an A area, a B area, and a C area, and the second bending motion also involves sequentially bending an A area, a B area, and a C area, the first display device 100 may perform the process of establishing the communication link with the second display device 200.

According to the present exemplary embodiment, when the first display device 100 determines whether to form the communication link, based on the pattern information, a user's intention may be exactly reflected. Thus, it is possible to prevent occurrence of an undesirable communication link between the first display device 100 and the second display device 200. In particular, when the first display device 100 and the second display device 200 have different forms, the determination based on the pattern information may be very useful.

In the present exemplary embodiment, the first display device 100 may establish the communication link by further referring to the distance difference between the first display device 100 and the second display device 200.

For example, the first display device 100 may establish the communication link only when the second display device 200 is positioned within a predetermined distance from the first display device 100. Also, the first display device 100 may establish the communication link only when the first display device 100 and the second display device 200 are included in the same communication network.

The first display device 100 may establish the communication link by further referring to the correspondence between the first bending motion and the second bending motion. That is, when the first bending motion and the second bending motion correspond to each other, the first display device 100 may establish the communication link with the second display device 200, and when the first bending motion and the second bending motion do not correspond to each other, the first display device 100 may not establish the communication link with the second display device 200. In this regard, when the first bending motion and the second bending motion do not correspond to each other, the first display device 100 may detect again the first bending motion or may obtain again information about the second bending motion.

In the present exemplary embodiment, when the first bending motion and the second bending motion correspond to each other, the first display device 100 may display a confirm request message regarding whether to establish a communication link. That is, when similar bending motions almost simultaneously occur in the first display device 100 and the second display device 200, the first display device 100 may receive confirmation from a user indicating whether the user desires to establish the communication link (or to share data), before the communication link is established (or before the data is shared).

The establishment of the communication link is further described in detail with reference to FIGS. 12 and 13.

Figure 12:
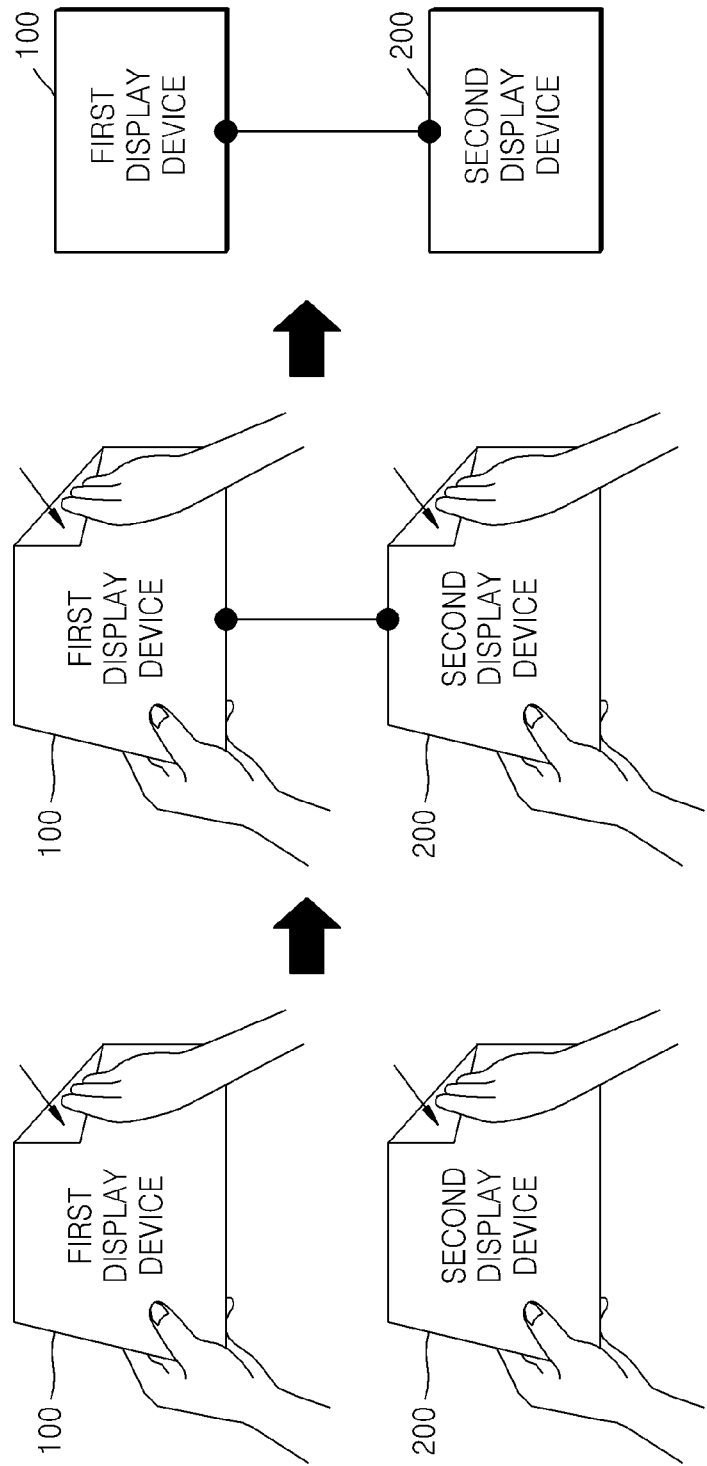
FIG. 12 illustrates a bending motion for establishing a communication link, according to an exemplary embodiment.

As illustrated in FIG. 12, when a first bending motion and a second bending motion are common with respect to bending an upper right edge of each display device, the first display device 100 may determine that the first bending motion and the second bending motion correspond to each other. Here, as illustrated in FIG. 12, the first display device 100 may automatically establish a communication link for a data exchange with the second display device 200, without a separate setting performed by a user.

For example, the first display device 100 may establish a communication link for Bluetooth communication with the second display device 200. That is, without a user input, the first display device 100 may automatically enter into a Bluetooth mode and may establish the communication link for Bluetooth communication with the second display device 200 via a link key.

Here, when the first bending motion and the second bending motion correspond to each other, the first display device 100 may automatically perform a pairing process for Bluetooth communication. Here, the term "pairing" means a status in which mutual communication connection is allowed between devices that support Bluetooth.

That is, the first display device 100 as a master device may receive, from the second display device 200, a Bluetooth device address, a product name, profile information, or the like that are related to the second display device 200. Here, the first display device 100 may transmit a paring request to the second display device 200 of which a bending motion corresponds to a bending motion of the first display device 100, and may receive identification (ID) information from the second display device 200. An example of the ID information may be a personal identification number (PIN) code.

When ID information requested by the first display device 100 matches with the ID information received from the second display device 200, pairing may occur between the first display device 100 and the second display device 200.

When the pairing is successful, the first display device 100 randomly calculates a Bluetooth address of the first display device 100 and a Bluetooth address of the second display device 200, so that that the first display device 100 may generate a link key. The link key may be stored in both the first display device 100 and the second display device 200. Thus, the first display device 100 and the second display device 200 that are paired once may be connected to each other at a later time by using the link key, without a separate pairing procedure.

In another exemplary embodiment, the first display device 100 may establish a communication link for NFC with the second display device 200. In this case, the first display device 100 may activate an NFC module without receiving a separate user input, and may transmit an NFC module-activation request message to the second display device 200.

In the present exemplary embodiment, the communication link may include, but is not limited to, NFC, Bluetooth, ZigBee, WFD, UWB, Wi-Fi, or the like.

As illustrated in FIG. 12, after the communication link is established between the first display device 100 and the second display device 200, although the first bending motion and the second bending motion end, the established communication link is maintained.

Figure 13:
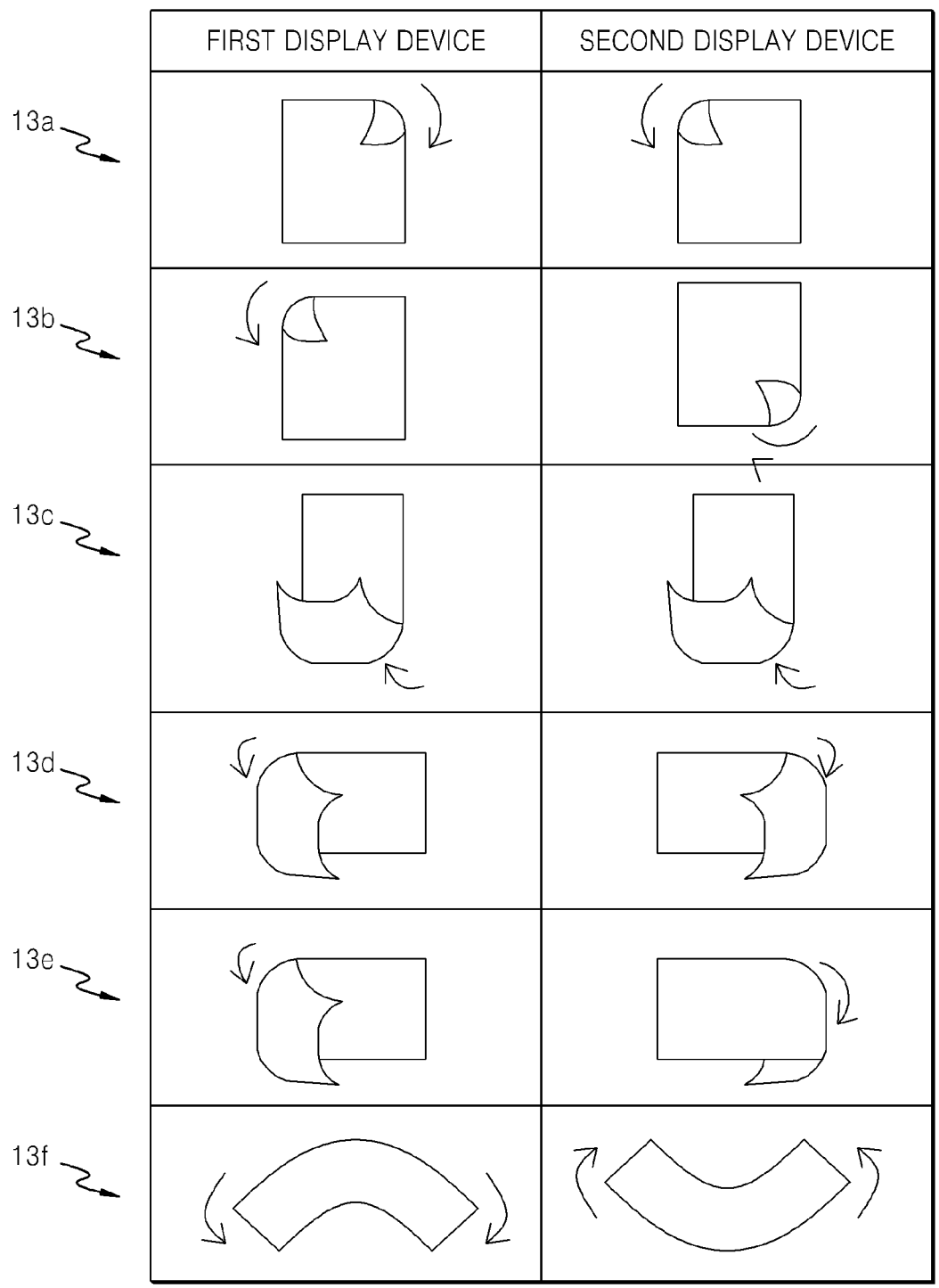
FIG. 13 illustrates various bending motions for establishing a communication link, according to an exemplary embodiment.

FIG. 13 illustrates various bending motions for establishing a communication link, according to an exemplary embodiment. As illustrated through reference number 13a, a first bending motion may be a motion of bending an upper right portion, and a second bending motion may be a motion of bending an upper left portion. Also, as illustrated through reference number 13b, the first bending motion may be a motion of bending an upper left portion, and the second bending motion may be a motion of bending a lower right portion.

As illustrated through reference number 13c, the first bending motion and the second bending motion may be the same motion of upwardly rolling lower portions of display apparatuses. As illustrated through reference number 13d, the first bending motion may be a motion of inwardly bending a left portion, and the second bending motion may be a motion of inwardly bending a right portion. As illustrated through reference number 13e, the first bending motion may be a motion of inwardly bending a left portion, and the second bending motion may be a motion of outwardly bending a right portion. As illustrated through reference number 13f, the first bending motion may be a motion of convexly bending a display device, and the second bending motion may be a motion of concavely bending a display device. That is, according to the present exemplary embodiment, the first bending motion and the second bending motion may vary.

Referring back to FIG. 7, the first display device 100 may transmit predetermined content to the second display device 200 via the communication link (operation S750). In the present exemplary embodiment, the first display device 100 may transmit content, which is previously stored in a memory (not shown), to the second display device 200.

The memory may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the first display device 100 may connect to web storage that performs a storing function of the memory via the Internet.

The predetermined content may include music, a document, a text, a still image, a moving picture, or the like. The content to be transmitted to the second display device 200 may be selected by a user. That is, the first display device 100 may recognize the content based on a bending gesture, a touch input, a voice input, or the like by the user.

Here, according to the present exemplary embodiment, before the communication link is established between the first display device 100 and the second display device 200, content to be transmitted to the second display device 200 may be first selected by a user. Also, in another exemplary embodiment, after the communication link is established between the first display device 100 and the second display device 200, content to be transmitted to the second display device 200 may be selected by a user. In another exemplary embodiment, the communication link is established between the first display device 100 and the second display device 200, and the first display device 100 may transmit predetermined content to the second display device 200, based on whether the first bending motion and the second bending motion correspond to each other. That is, based on whether the first bending motion and the second bending motion correspond to each other, the first display device 100 may establish a communication link with the second display device 200 or may share content with the second display device 200.

Figure 8:
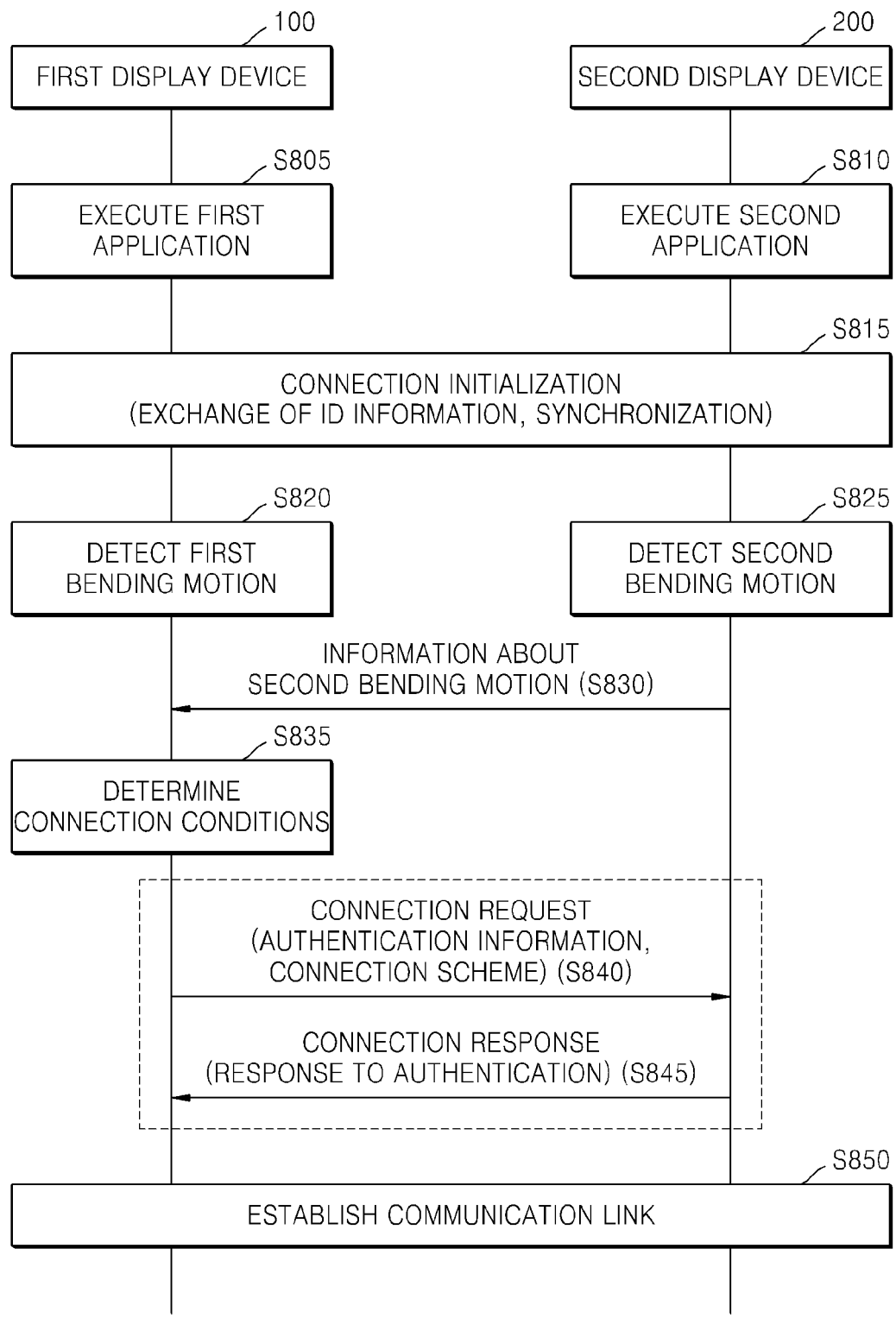
FIG. 8 is a flowchart of a method of establishing a communication link between the first display device and the second display device, according to an exemplary embodiment.

With reference to FIG. 8, a method of establishing a communication link according to a bending motion is now described in detail.

FIG. 8 is a flowchart of a method of establishing a communication link between the first display device 100 and the second display device 200, according to an exemplary embodiment.

In operation S805, the first display device 100 may execute a first application. The first display device 100 may execute the first application based on a user input or may automatically execute the first application.

In operation S810, the second display device 200 may execute a second application. The second display device 200 may execute the second application based on a user input or may automatically execute the second application.

The first application and the second application indicate connection applications for establishment of a communication link. The first application and the second application may be dedicated applications that only perform a communication link establishing process, or may be applications that provide various services including the communication link establishing process. For example, the first application and the second application may provide a message service, a social network service (SNS), a multimedia content reproduction service, or the like.

In operation S815, the first display device 100 and the second display device 200 may perform connection initialization (synchronization). Here, the connection initialization (synchronization) may mean a process in which a data transmission time of a transmission device and a data reception time of a reception device are exactly synchronized. Here, the first display device 100 may transmit ID information of the first display device 100 to the second display device 200, and may receive ID information of the second display device 200. The ID information may include, but is not limited to, a device ID, a device name, and a MAC address.

In another exemplary embodiment, after the connection initialization (synchronization) between the first display device 100 and the second display device 200, the first application and/or the second application may be executed. Alternatively, operation S815 may be performed after operations S820 and S825.

In operation S820, the first display device 100 may detect a first bending motion. In operation S825, the second display device 200 may detect a second bending motion.

In operation S830, the first display device 100 may receive information about the second bending motion from the second display device 200. In the present exemplary embodiment, the first display device 100 may receive the information about the second bending motion in the form of a separate file after the connection initialization, or may receive the information about the second bending motion via a pilot or control channel during the connection initialization.

The first display device 100 may additionally receive position information of the second display device 200. The position information of the second display device 200 may be obtained via global positioning system (GPS) information, internet protocol (IP) address information, domain information, or the like.

In operation S835, the first display device 100 may determine fulfillment of connection conditions. That is, the first display device 100 may determine whether a difference between a start time of the first bending motion and a start time of the second bending motion is less than a threshold value. Also, the first display device 100 may determine correspondence between pattern information of the first bending motion and pattern information of the second bending motion, whether a distance difference between the first display device 100 and the second display device 200 is less than a predetermined distance, correspondence between the first bending motion and the second bending motion, or the like.

Operations S820 through S835 correspond to operations S710 through S730 of the flowchart shown in FIG. 7, and thus, detailed descriptions thereof are omitted here. In another exemplary embodiment, the second display device 200 may submit a request to the first display device 100 for information about the first bending motion, may receive the information from the first display device 100 about the first bending motion, and then may determine connection conditions.

In operation S840, when the difference between the start time of the first bending motion and the start time of the second bending motion is less than the threshold value, the first display device 100 may transmit a connection request to the second display device 200.

The connection request may include one or more pieces of information that are required to establish a communication link with the second display device 200. For example, the connection request may include a connection scheme, an SSID of a wireless LAN, a channel number, a security key, other security information, or the like. The connection scheme may include, but is not limited to, a wireless LAN (an ad-hoc mode or an infra structure mode), Bluetooth, ZigBee, WFD, UWB, or the like.

In operation S845, the first display device 100 receives a response to the connection request from the second display device 200. The response to the connection request may include authentication information such as the security key or the like.

The connection request of operation S840 and the connection response of operation S845 may be omitted in another exemplary embodiment.

In operation S850, the first display device 100 and the second display device 200 may establish a communication link.

In another exemplary embodiment, an order of operations S805 through S850 may be changed, and some of them may be omitted.

With reference to FIG. 9, a method of sharing data between the first display device 100 and the second display device 200 is described in detail.

FIG. 9 is a flowchart of a method of sharing data between the first display device 100 and the second display device 200, according to an exemplary embodiment.

In operation S905, the first display device 100 may execute a first application. In this case, the first display device 100 may set a share mode or a share-target based on a user input. That is, a user may select the share mode or a first share-target via the first application.

The share mode may operate in one of a transmission mode, a reception mode, and a transception mode. In the transmission mode, the first display device 100 may transmit first share data to the second display device 200, in the reception mode, the first display device 100 may receive second share data from the second display device 200, and in the transception mode, the first display device 100 may transmit first share data to the second display device 200 and, may receive second share data from the second display device 200.

In operation S910, the second display device 200 may execute a second application. In this case, the second display device 200 may set a share mode or a second share-target based on a user input. That is, the second display device 200 may also operate in one of the reception mode, the transmission mode, and the transception mode. Operations S915 through S945 correspond to operations S815 through S845 shown in FIG. 8, and thus, detailed descriptions are omitted here.

It is assumed that, in operations S950 through S965, the first display device 100 operates in the transmission mode, and the second display device 200 operates in the reception mode.

In operation S950, the first display device 100 may transmit a data share request to the second display device 200. The data share request may include information about first share-target (content). For example, the data share request may include a title, a type, an ID value, a size, metadata, and link information that are related to the first share-target (content).

When the second display device 200 receives the data share request, the second display device 200 may display a graphical user interface (GUI) on its screen, wherein the GUI includes items such as "Accept", "Ignore", or the like so as to make a user confirm information about the first display device 100 or a transmitter, information about the first share-target (content), and whether to connect with the first display device 100.

In operation S955, when the user of the second display device 200 selects "Accept", the second display device 200 is ready to receive data of the first share-target (content). Afterward, in operation S960, the second display device 200 may transmit a response to the data share request to the first display device 100.

In the present exemplary embodiment, the selection of "Accept" or "Ignore" may be performed by a bending gesture or a touch gesture by the user.

In operation S965, the first display device 100 transmits the data of the first share-target (content) to the second display device 200. In this case, according to the present exemplary embodiment, the first display device 100 and the second display device 200 may exchange data according to the DLNA specification or the UPnP specification.

In another exemplary embodiment, an order of operations S905 through S965 may be changed, and some of them may be omitted.

FIG. 14 illustrates a bending motion by which a communication link is established by using an arrangement status of a plurality of display devices, according to an exemplary embodiment.

In the present exemplary embodiment, when the plurality of display devices are stacked, and the bending motion with respect to the plurality of display devices is detected, the communication link is established between the plurality of display devices, and content that is stored in the uppermost display device is transmitted to the lower display device.

Figure 14A:
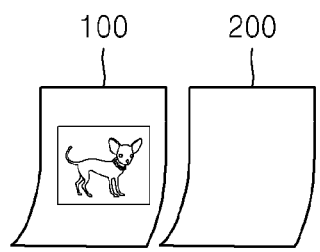
FIGS. 14A-14C illustrate a bending motion by which a communication link is established by using an arrangement status of a plurality of display devices, according to an exemplary embodiment.

As illustrated in FIG. 14A, in order to transmit content that is displayed on the first display device 100 to the second display device 200, a user may stack the first display device 100 and the second display device 200. Here, the first display device 100 and the second display device 200 which are vertically disposed may obtain arrangement status information by using a touch sensor, a pressure sensor, a tactile sensor, an illuminance sensor, a proximity sensor, an RFID reader, or an RFID tag. For example, the second display device 200 may detect a touch by the first display device 100, which is disposed above the second display device 200, by using a touch sensor disposed near a screen of the second display device 200.

Also, the first display device 100 may compare an illuminance value, which is received from the sensing unit 110, with an illuminance value that is received from the second display device 200, and then may determine whether the second display device 200 is positioned below the first display device 100.

In the present exemplary embodiment, the first display device 100 may detect a touch or an approach by the second display device 200 via an RFID tag or an NFC tag. For example, it is assumed that the RFID tag (or the NFC tag) is disposed at an upper portion of each of the first display device 100 and the second display device 200, and an RFID reader (or the NFC reader) is disposed at a lower portion of each of the first display device 100 and the second display device 200. In this case, when the second display device 200 is disposed below the first display device 100, the RFID reader (or the NFC reader) of the first display device 100 receives information that is stored in the RFID tag (or the NFC tag) of the second display device 200, so that the first display device 100 may detect existence, a position, an ID value, or the like that are related to the second display device 200.

In another exemplary embodiment, the RFID tag (or the NFC tag) may be disposed at a lower portion of each of the first display device 100 and the second display device 200, and the RFID reader (or the NFC reader) may be disposed at an upper portion of each of the first display device 100 and the second display device 200. Here, when the second display device 200 is disposed below the first display device 100, the RFID reader (or the NFC reader) of the second display device 200 receives information that is stored in the RFID tag (or the NFC tag) of the first display device 100, so that the second display device 200 may recognize that the first display device 100 is disposed above the second display device 200. Also, the second display device 200 may transmit arrangement information to the first display device 100 informing the first display device 100 that the second display device 200 is disposed below the first display device 100, an ID value of the second display device 200, or the like. In this case, the first display device 100 may detect the touch (or the approach) by the second display device 200, and the arrangement information with respect to the first display device 100 and the second display device 200.

Figure 14B:
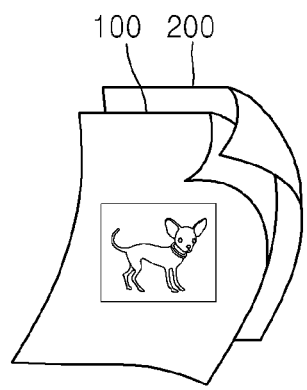

Also, as illustrated in FIG. 14B, when a user bends upper right corners of the first display device 100 and the second display device 200, the first display device 100 detects a first bending motion, and then collects information about a second bending motion from the second display device 200. Here, when the first bending motion and the second bending motion correspond to each other, the first display device 100 may establish a communication link with the second display device 200, an may transmit content to the second display device 200 via the communication link.

In the present exemplary embodiment, the first display device 100 may determine a transmission device (i.e., a master device) and a reception device (i.e., a slave device) according to an arrangement order of the first display device 100 and the second display device 200. For example, as illustrated in FIG. 14B, since the first display device 100 is disposed above the second display device 200, the first display device 100 may become the master device and then may transmit the content, which is stored in the first display device 100, to the second display device 200.

Figure 14C:
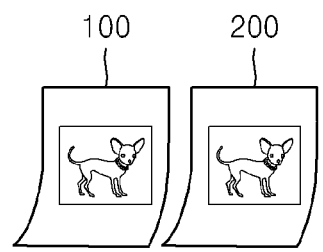

Thus, as illustrated in FIG. 14C, the content that is displayed on the first display device 100 may be equally displayed on the second display device 200.

The second display device 200 may be one or more devices. That is, the first display device 100 may establish the communication link with a plurality of the second display devices 200, and may transmit the content to the plurality of the second display devices 200.

In the present exemplary embodiment, the first display device 100 may disconnect the communication link, based on a bending motion. The first display device 100 may detect a third bending motion of the first display device 100 or may receive information about a fourth bending motion of the second display devices 200. Then, the first display device 100 may disconnect the communication link, based on the third bending motion or the fourth bending motion. The disconnection is further described in detail with reference to FIGS. 15 and 16.

Figure 15:
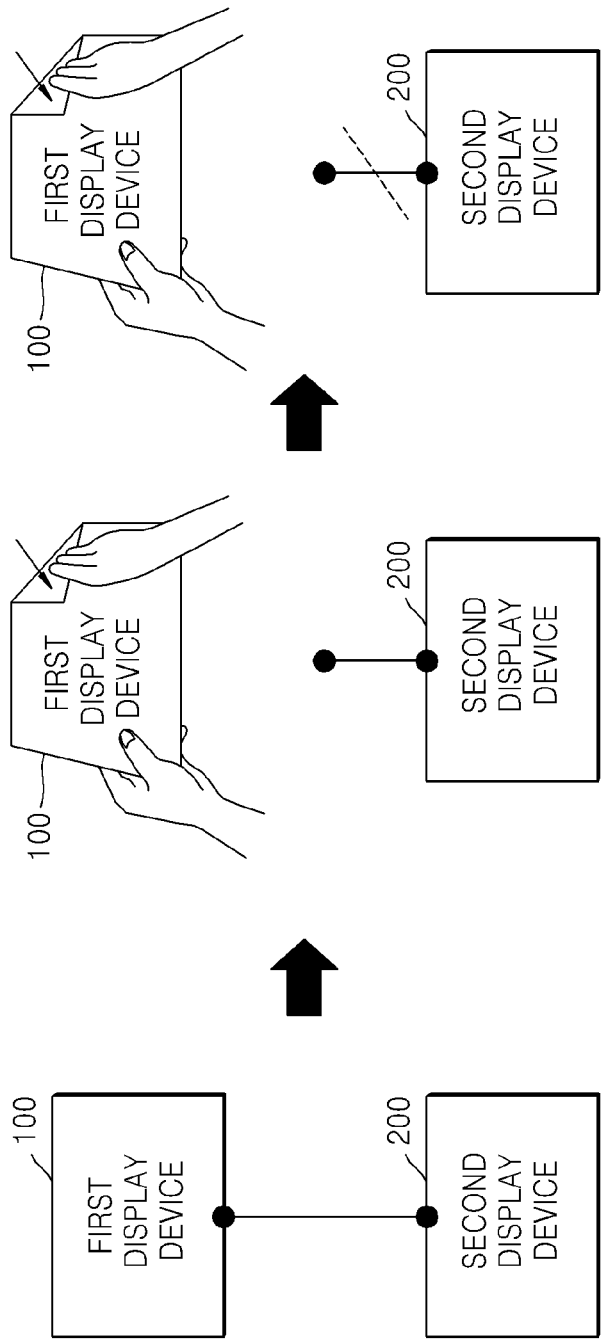
FIG. 15 illustrates a bending motion for disconnecting a communication link, according to an exemplary embodiment.

FIG. 15 illustrates a bending motion for disconnecting a communication link, according to an exemplary embodiment.

As illustrated in FIG. 15, a communication link may be established between the first display device 100 and the second display device 200.

Here, as illustrated in FIG. 15, when a third bending motion that occurs in the first display device 100 matches with a first bending motion for establishing the communication link, or a difference between the third bending motion and the first bending motion is within a predetermined range, the first display device 100 disconnects the communication link.

That is, a user may disconnect the communication link that is established between the first display device 100 and the second display device 200, by performing again a bending motion for establishing the communication link on the first display device 100 or the second display device 200. For example, when the communication link is established between the first display device 100 and the second display device 200 according to a motion of bending upper right portions of the first display device 100 and the second display device 200, the user may disconnect the communication link between the first display device 100 and the second display device 200, by repeating a motion of bending the upper right portion of one of the first display device 100 or the second display device 200.

Figure 16:
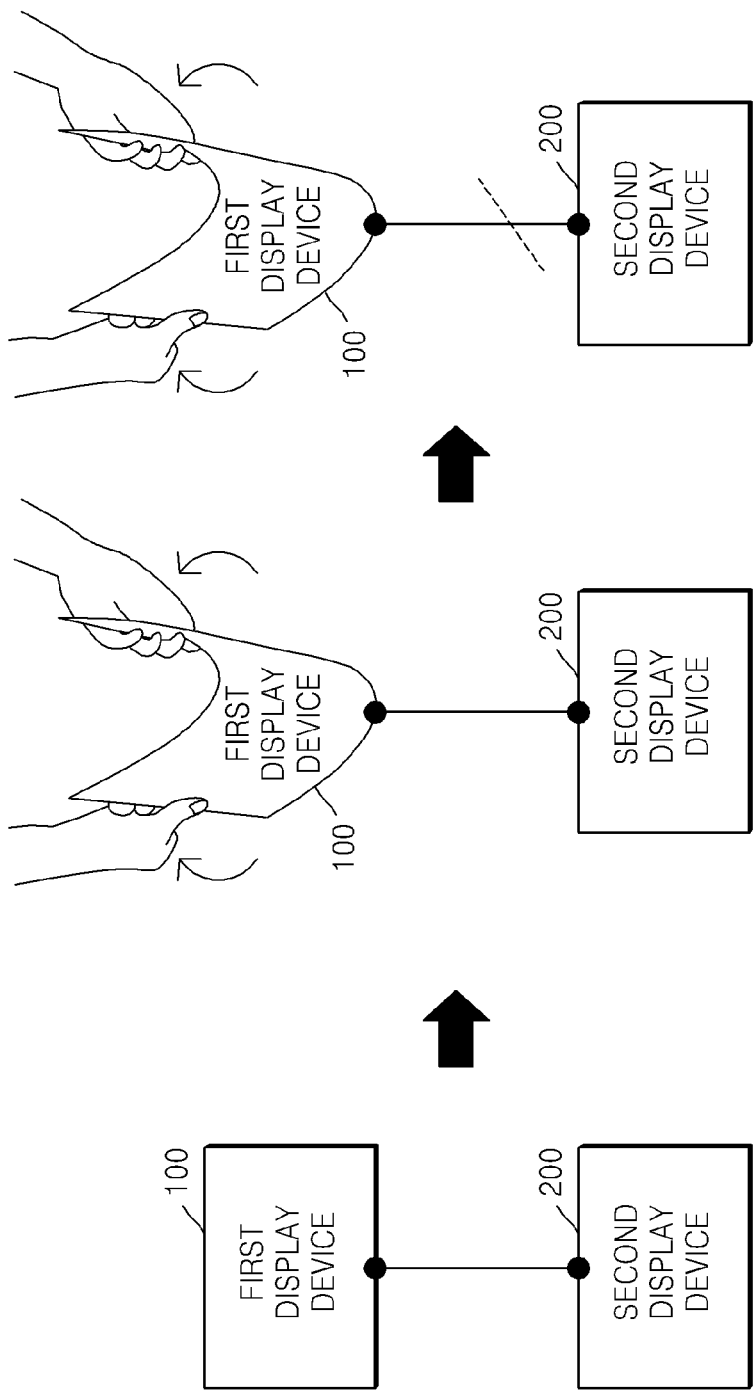
FIG. 16 illustrates a bending motion for disconnecting a communication link, according to another exemplary embodiment.

FIG. 16 illustrates a bending motion for disconnecting a communication link, according to another exemplary embodiment exemplary embodiment.

As illustrated in FIG. 16, a communication link may be established between the first display device 100 and the second display device 200.

Here, as illustrated in FIG. 16, when a third bending motion that occurs in the first display device 100 is symmetrical to a first bending motion for establishing the communication link, with respect to a predetermined axis, the first display device 100 disconnects the communication link.

That is, a user may disconnect the communication link that is established between the first display device 100 and the second display device 200, by performing a bending motion that is opposite to a bending motion for establishing the communication link on the first display device 100 or the second display device 200. For example, when the communication link is established between the first display device 100 and the second display device 200 according to a motion of convexly bending an entire portion of the second display device 200, the user may disconnect the communication link between the first display device 100 and the second display device 200, by concavely bending an entire portion of one of the first display device 100 and the second display device 200.

In order to establish a communication link between communication-enabled devices according to the related art, it is required to perform several processes by using an environment setting menu, a communication menu, or the like. However, in the method of establishing a communication link according to the present exemplary embodiment, the user may rapidly establish a communication link between a plurality of display devices by performing a simple bending motion, without establishing a communication link by using a separate menu.

In another exemplary embodiment, the communication system may further include the server 300 as well as the first display device 100 and the second display device 200.

Figure 17:
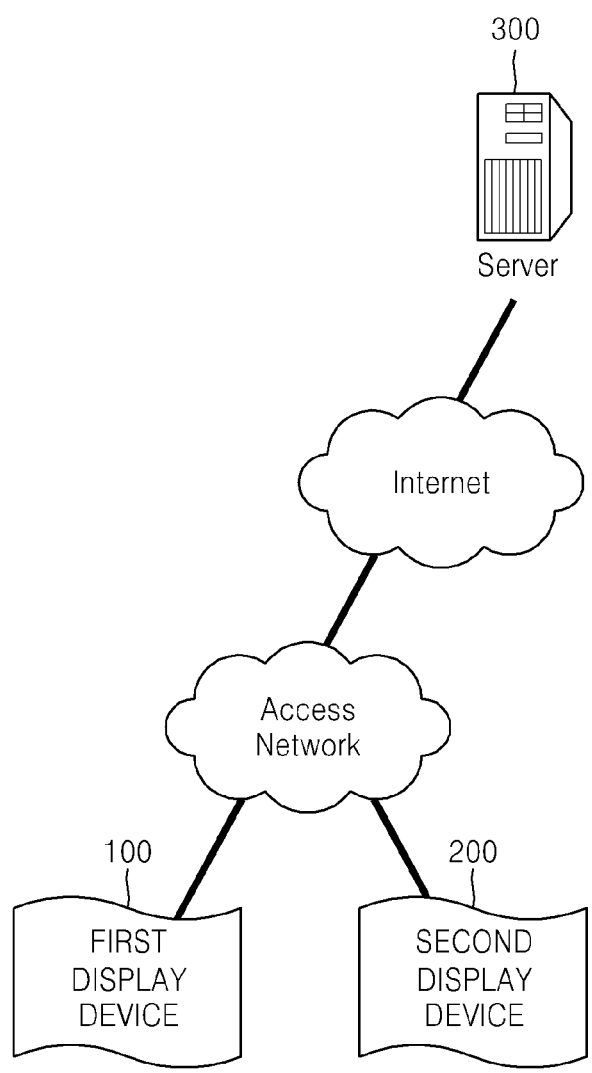
FIGS. 17 and 18 illustrate a communication system, according to exemplary embodiments.

As illustrated in FIG. 17, the server 300 may be connected to the first display device 100 or the second display device 200 via a mobile communication network. That is, the first display device 100 or the second display device 200 may access the server 300 via an access network and an internet network.

The mobile communication network may include, but is not limited to, various networks such as 2G/3G/4G, WCDMA, GSM, and WIBRO.

Figure 18:
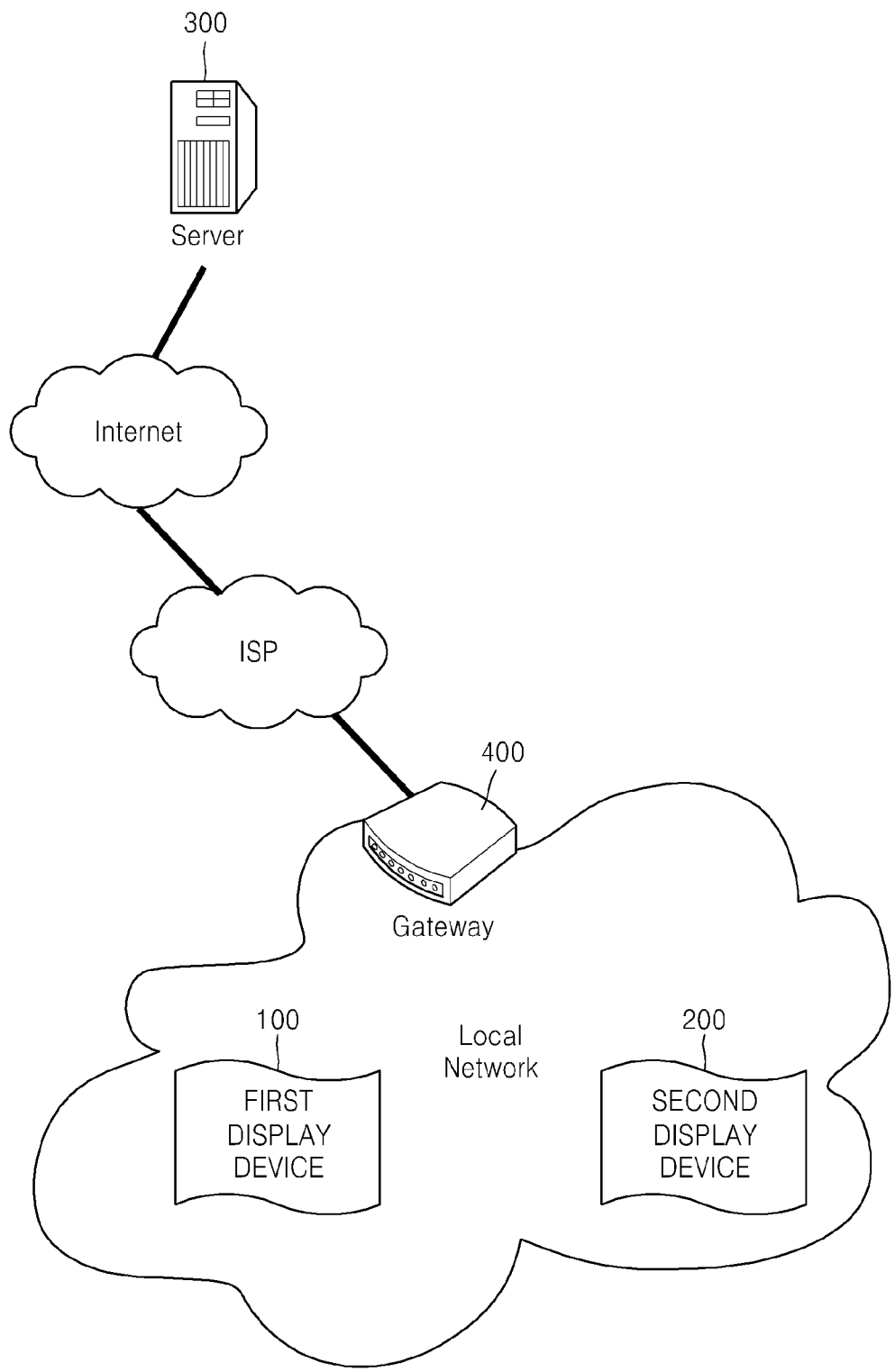

As illustrated in FIG. 18, the server 300 may be connected to the first display device 100 or the second display device 200 via the gateway 400, an ISP, and an internet network.

Hereinafter, with reference to FIG. 19, the server 300 that establishes a communication link between the first display device 100 and the second display device 200 is described in detail.

According to the present exemplary embodiment, the server 300 may include a receiving unit 310, a determining unit 320, a transmitting unit 330, and a control unit 340. However, not all shown elements are necessary elements. That is, the server 300 may be embodied with more or less elements than the shown elements.

Hereinafter, the shown elements are described. The receiving unit 310 may obtain information about a first bending motion of the first display device 100 and information about a second bending motion of the second display device 200. For example, the receiving unit 310 may receive information about a bending motion from each of the first display device 100 and the second display device 200.

The information about a bending motion may include a plurality of pieces of information about a bent position, a bending direction, a degree of bending, a bending strength, a bending speed, a total number of times the bending motion occurs, a start time of the bending motion, an elapsed-time of the bending motion, and a bending pattern.

When the first display device 100 and the second display device 200 are stacked, the receiving unit 310 of the server 300 may receive arrangement information from at least one of the first display device 100 and the second display device 200. The server 300 may obtain the arrangement information about an arrangement of the first display device 100 and the second display device 200, by using a sensor or an NFC tag, which is mounted at each of the first display device 100 and the second display device 200. Also, the receiving unit 310 may receive position information of each of the first display device 100 and the second display device 200. The position information may be obtained via GPS information, IP address information, domain information, or the like.

The determining unit 320 may determine whether a difference between a start time of the first bending motion and a start time of the second bending motion is less than a threshold value. Also, the determining unit 320 may determine correspondence between the first bending motion and the second bending motion. The determining unit 320 may determine the correspondence between the first bending motion and the second bending motion, based on a bent position, a bending direction, a degree of bending, a bending strength, a bending speed, a total number of times the bending motion occurs, a start time of the bending motion, an elapsed-time of the bending motion, and a bending pattern of each of the first bending motion and the second bending motion.

For example, when a difference between the first bending motion and the second bending motion is within a predetermined range, the determining unit 320 may determine that the first bending motion and the second bending motion correspond to each other. Also, when the first bending motion and the second bending motion are symmetrical to each other with respect to a predetermined axis, the determining unit 320 may determine that the first bending motion and the second bending motion correspond to each other.

The determining unit 320 may determine whether a distance difference between the first display device 100 and the second display device 200 is within a predetermined range.

Based on a result of the determination, the transmitting unit 330 may transmit communication connection information required to establish a communication link between the first display device 100 and the second display device 200 to the first display device 100 and the second display device 200. For example, when the difference between the start time of the first bending motion and the start time of the second bending motion is less than the threshold value, the transmitting unit 330 may transmit the communication connection information to the first display device 100 and the second display device 200.

Also, according to the present exemplary embodiment, when the first bending motion and the second bending motion correspond to each other, and the distance between the first display device 100 and the second display device 200 is within the predetermined range, the transmitting unit 330 may transmit the communication connection information to the first display device 100 and the second display device 200.

The communication connection information may include device ID information, connection scheme information, a channel number, a security key, other security information, or the like. According to the present exemplary embodiment, the connection scheme may include, but is not limited to, a wireless LAN (an ad-hoc mode or an infra structure mode), NFC, Bluetooth, ZigBee, WFD, and UWB.

The server 300 may receive a content request by the first display device 100 from the second display device 200. Here, the server 300 may transmit information about the second display device 200 and a content request message to the first display device 100.

The server 300 may receive content from the first display device 100, in response to the content request. Here, the server 300 may receive the content from the first display device 100 or may receive link information about the content from the first display device 100. The link information means access information about a website including the content. An example of the link information may be a uniform resource locator (URL) address, or the like.

The server 300 may transmit the content, which is received from the first display device 100, to the second display device 200. Here, when the server 300 receives the link information about the content from the first display device 100, the server 300 may download the content based on the link information, and then may transmit the content to the second display device 200, or may transmit the link information about the content to the second display device 200.

The control unit 340 may generally control the receiving unit 310, the determining unit 320, and the transmitting unit 330.

Also, in the present exemplary embodiment, the control unit 340 may determine a master device and a slave device from among the first display device 100 and the second display device 200. That is, the control unit 340 may determine the master device and the slave device according to roles of the first display device 100 and the second display device 200 that are enabled to perform mutual communication.

According to the present exemplary embodiment, the control unit 340 of the server 300 may determine the master device and the slave device based on at least one of a bent position, a bending direction, a degree of bending, a bending strength, a bending speed, a total number of times a bending motion occurs, a start time of the bending motion, and an elapsed-time of the bending motion that are related to a bending motion of the first display device 100 and a bending motion of the second display device 200. For example, the control unit 340 of the server 300 may determine a display device, which has an earlier start time of the bending motion, as the master device.

Also, in the present exemplary embodiment, the server 300 may determine the master device and the slave device based on arrangement information. For example, the server 300 may determine an uppermost-positioned display device as the master device.

In the present exemplary embodiment, the first display device 100 is the transmission device, and the second display device 200 is the reception device, and thus, the server 300 may determine the first display device 100 as the master device and may determine the second display device 200 as the slave device. The server 300 may transmit information about the roles (the master device/the slave device) to the first display device 100 and the second display device 200.

Hereinafter, with reference to FIG. 20, a method of establishing, by the server 300, a communication link between the first display device 100 and the second display device 200 by using elements of the server 300 is now described in detail.

Figure 20:
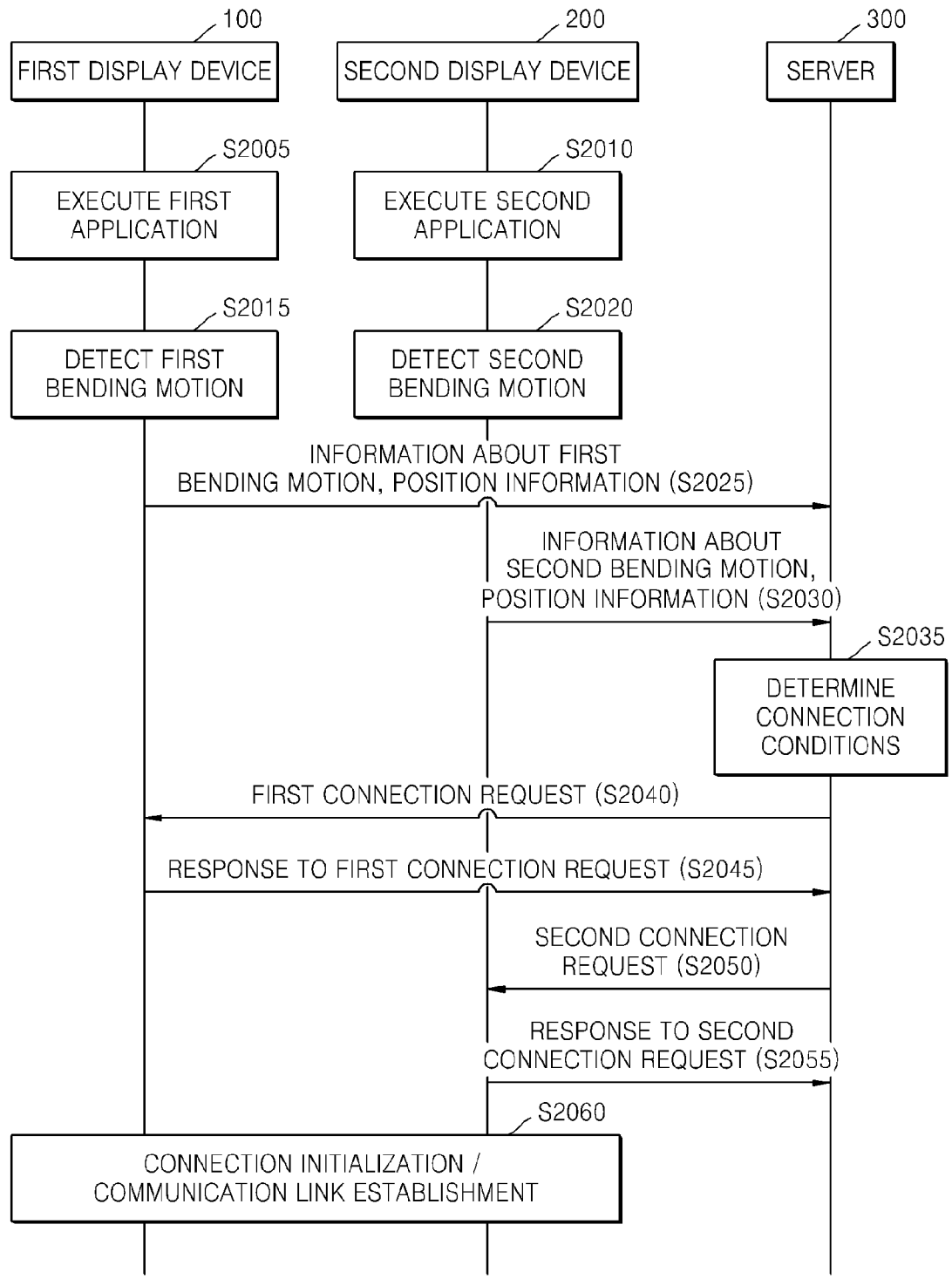
FIG. 20 is a flowchart of a method of establishing, by the server, a communication link between the first display device and the second display device, according to an exemplary embodiment.

FIG. 20 is a flowchart of a method of establishing, by the server 300, a communication link between the first display device 100 and the second display device 200, according to an exemplary embodiment.

Figure 19:
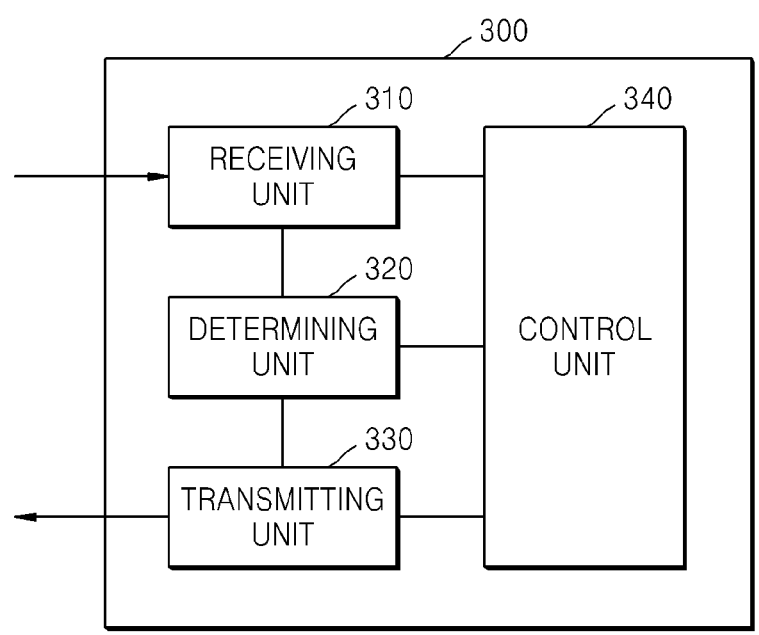
FIG. 19 is a block diagram illustrating a server, according to an exemplary embodiment.

Referring to FIG. 20, the method includes operations that are processed in chronological order by the server 300 shown in FIG. 19. Thus, hereinafter, although the above descriptions of the server 300 shown in FIG. 19 are omitted, the descriptions may also be applied to the method of FIG. 20.

In operation S2005, the first display device 100 may execute a first application. The first display device 100 may execute the first application based on a user input or may automatically execute the first application.

In operation S2010, the second display device 200 may execute a second application. The second display device 200 may execute the second application based on a user input or may automatically execute the second application.

The first application and the second application indicate connection applications for establishment of a communication link. The first application and the second application may be dedicated applications that only perform a communication link establishing process, or may be applications that provide various services including the communication link establishing process. For example, the first application and the second application may provide a messenger service, a SNS, a multimedia content reproduction service, or the like.

In operation S2015, the first display device 100 may detect a first bending motion. In operation S2020, the second display device 200 may detect a second bending motion.

Operations S2005 through S2020 correspond to operations S805, S810, S820, and S825 of the flowchart shown in FIG. 8, and thus, detailed descriptions thereof are omitted here.

In operation S2025, the server 300 may receive, from the first display device 100, ID information of the first display device 100, information about a communication scheme that is supported by the first display device 100, information about the first bending motion, position information of the first display device 100, or the like.

In operation S2030, the server 300 may receive, from the second display device 200, ID information of the second display device 200, information about a communication scheme that is supported by the second display device 200, information about the second bending motion, position information of the second display device 200, or the like.

In the present exemplary embodiment, information about a bending motion may include a plurality of pieces of information about a bent position, a bending direction, a degree of bending, a bending strength, a bending speed, a total number of times the bending motion occurs, a start time of the bending motion, and an elapsed-time of the bending motion. According to the present exemplary embodiment, the connection scheme may include, but is not limited to, a wireless LAN (an ad-hoc mode or an infra structure mode), NFC, Bluetooth, ZigBee, WFD, and UWB.

In operation S2035, the server 300 may determine fulfillment of connection conditions with respect to connection between the first display device 100 and the second display device 200, based on the information about the first bending motion, the position information of the first display device 100, the information about the second bending motion, and the position information of the second display device 200.

That is, the server 300 may determine correspondence between the first bending motion and the second bending motion. Also, the server 300 may determine whether a distance between the first display device 100 and the second display device 200 is within a predetermined scope.

In the present exemplary embodiment, when the first bending motion and the second bending motion correspond to each other, and the distance between the first display device 100 and the second display device 200 is within the predetermined scope, the server 300 may determine that the connection conditions are fulfilled.

When the connection conditions are fulfilled, the server 300 may compare communication connection schemes that are supported by the first display device 100 and the second display device 200, the position information of each of the first display device 100 and the second display device 200, or the like, so that the server 300 may determine at least one appropriate communication connection scheme. For example, when both the first display device 100 and the second display device 200 support an ad-hoc mode of a wireless LAN, the server 300 may determine the ad-hoc mode as the communication connection scheme.

In operation S2040, the server 300 may transmit a first connection request to the first display device 100. The first connection request may include ID information of the second display device 200, communication connection scheme information (e.g., an ad-hoc mode), first authentication information (e.g., a security key), or the like.

In operation S2050, the server 300 may transmit a second connection request to the second display device 200. The second connection request may include ID information of the first display device 100, communication connection scheme information (e.g., an ad-hoc mode), second authentication information (e.g., a security key), or the like. In the present exemplary embodiment, the first authentication information and the second authentication information may be the same as each other or may be different from each other.

According to the present exemplary embodiment, the first display device 100 may display a GUI on its screen, wherein the GUI includes items such as "Accept", "Ignore", or the like so as to make a user confirm ID information of the second display device 200, communication connection scheme information, and whether to connect with the second display device 200. The second display device 200 may also display a GUI on its screen, wherein the GUI includes items such as "Accept", "Ignore", or the like so as to make a user confirm ID information of the first display device 100, communication connection scheme information, and whether to connect with the first display device 100.

In operation S2045, when the user of the first display device 100 selects "Accept", the server 300 may receive a first connection response with respect to the first connection request from the first display device 100.

Also, in operation S2055, when the user of the second display device 200 selects "Accept", the server 300 may receive a second connection response with respect to the second connection request from the second display device 200.

In operation S2060, the first display device 100 and the second display device 200 may perform connection initialization (synchronization) or may establish a communication link, based on the ID information, the communication connection scheme information, and the authentication information of an opposing display device which is received from the server 300. In this case, the first display device 100 and the second display device 200 may freely share data via the communication link.

In another exemplary embodiment, an order of operations S2005 through S2060 may be changed, and some of them may be omitted.

According to the present exemplary embodiment, the server 300 may automatically establish the communication link between a plurality of devices that are positioned within a predetermined range, based on a simple bending motion by a user.

Figure 21:
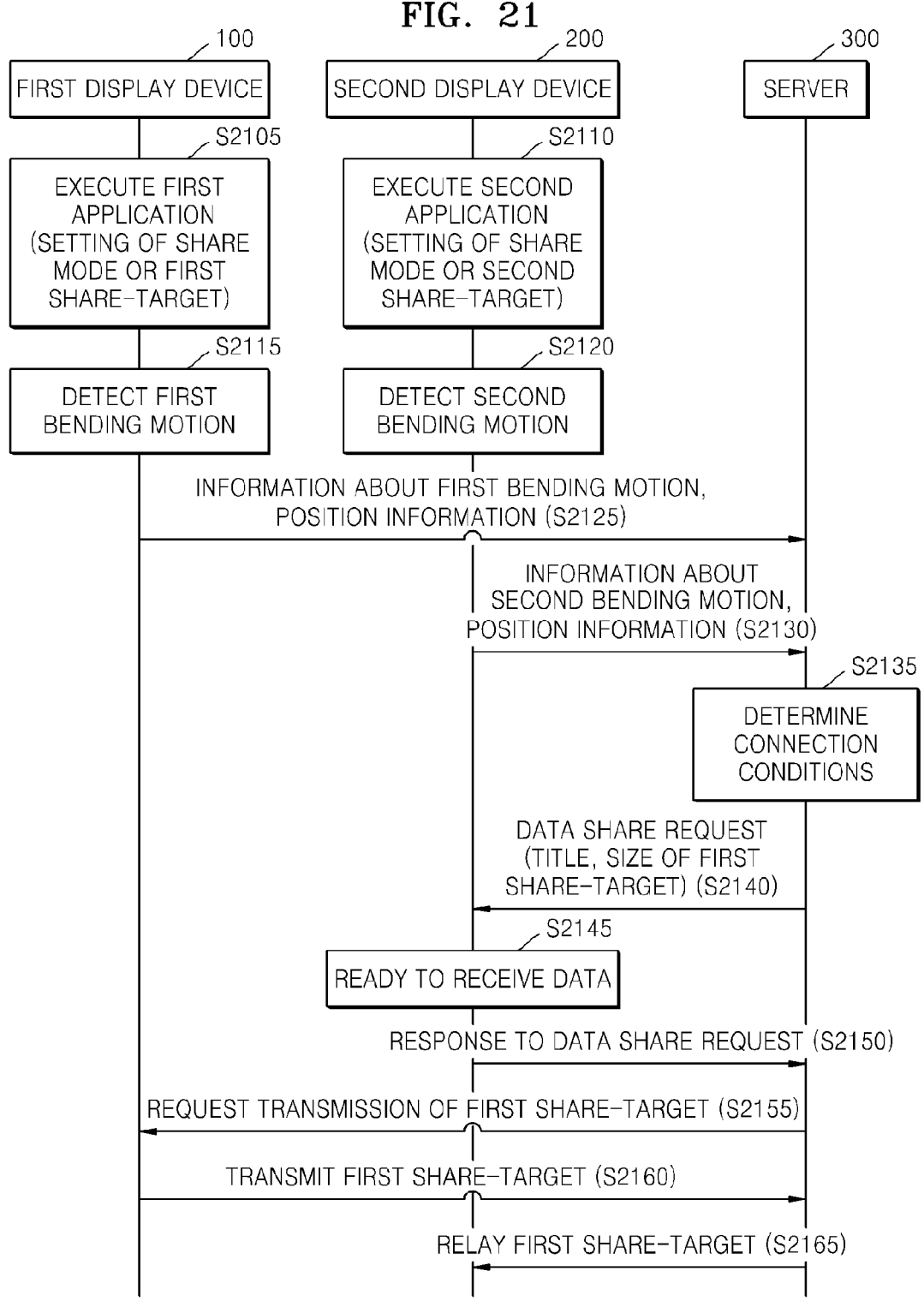
FIG. 21 is a flowchart of a method of sharing data between the first display device and the second display device via the server, according to an exemplary embodiment.

FIG. 21 is a flowchart of a method of sharing data between the first display device 100 and the second display device 200 via the server 300, according to an exemplary embodiment.

In operation S2105, the first display device 100 may execute a first application. In this case, the first display device 100 may set a share mode or a first share-target, based on a user input. That is, a user may select the share mode or the first share-target via the first application.

The share mode may operate in one of a transmission mode, a reception mode, and a transception mode. In the transmission mode, the first display device 100 may transmit first share data to the second display device 200, in the reception mode, the first display device 100 may receive second share data from the second display device 200, and in the transception mode, the first display device 100 may transmit first share data to the second display device 200 and, may receive second share data from the second display device 200.

In operation S2110, the second display device 200 may execute a second application. In this case, the second display device 200 may set a share mode or a second share-target, based on a user input. That is, the second display device 200 may also operate in at least one of a transmission mode, a reception mode, and a transception mode.

Operations S2115 and S2120 correspond to operations S2015 and S2020 of the flowchart shown in FIG. 20, and thus, detailed descriptions thereof are omitted here.

In operation S2125, the server 300 may receive, from the first display device 100, ID information of the first display device 100, information about a communication scheme that is supported by the first display device 100, information about the first bending motion, position information of the first display device 100, share mode information, information about the first share-target (content), or the like. The share mode information is information about whether the first display device 100 operates in a reception mode, a transmission mode, or a transception mode.

The information about the first share-target (content) is information about a target (content) to be transmitted to the second display device 200, when the first display device 100 operates in the transmission mode. For example, the information about the first share-target (content) may include, but is not limited to, a title, a type, an ID value, a size, metadata, and link information that are related to the first share-target (content).

In operation S2130, the server 300 may receive, from the second display device 200, ID information of the second display device 200, information about a communication scheme that is supported by the second display device 200, information about the second bending motion, position information of the second display device 200, share mode information, information about the second share-target (content), or the like.

The information about the second share-target (content) is information about a target (content) to be transmitted to the first display device 100, when the second display device 200 operates in the transmission mode. For example, the information about the second share-target (content) may include, but is not limited to, a title, a type, an ID value, a size, metadata, and link information that are related to the second share-target (content).

It is assumed that, in operations S2140 through S2165, the first display device 100 operates in the transmission mode and the second display device 200 operates in the reception mode.

In operation S2135, the server 300 may determine fulfillment of connection conditions between the first display device 100 and the second display device 200, based on the information about the first bending motion, the position information of the first display device 100, the information about the second bending motion, and the position information of the second display device 200.

For example, when a difference between a start time of the first bending motion and a start time of the second bending motion is less than a threshold value, and a distance between the first display device 100 and the second display device 200 is less than a predetermined distance, the server 300 may determine the connection conditions are fulfilled. In operation S2140, when the connection conditions between the first display device 100 and the second display device 200 are fulfilled, the server 300 may transmit a data share request to the second display device 200. The data share request may include the information about a first share-target (content) (e.g., the ID value and size of the first share-target, or the like).

When the second display device 200 receives the data share request, the second display device 200 may display a GUI on its screen, wherein the GUI includes items such as "Accept", "Ignore", or the like so as to make a user confirm information of the first display device 100 or a transmitter, the information about first share-target (content), and whether to connect with the first display device 100.

In operation S2145, when the user of the second display device 200 selects "Accept", the second display device 200 is ready to receive data of the first share-target (content). Then, in operation S2150, the second display device 200 transmits a response with respect to the data share request to the first display device 100. In the present exemplary embodiment, the selection of "Accept" or "Ignore" may be achieved via a bending gesture or a touch gesture by the user.

In operation S2155, the server 300 may request the first display device 100 to transmit the first share-target (content). In this case, in operation S2160, the first display device 100 transmits the first share-target (content) to the server 300.

In operation S2165, the server 300 transmits the first share-target (content), which is received from the first display device 100, to the second display device 200. That is, as illustrated in FIG. 20, a communication link is directly established between the first display device 100 and the second display device 200 so that data is shared therebetween. However, in another exemplary embodiment, as illustrated in FIG. 21, data may be shared between the first display device 100 and the second display device 200 via the server 300.

In another exemplary embodiment, an order of operations S2105 through S2165 may be changed, and some of them may be omitted.

FIG. 22 illustrates a method of, by the first display device 100, forming a communication link with a plurality of external display devices and sharing data with the plurality of external display devices, according to an exemplary embodiment.

Figure 22A:
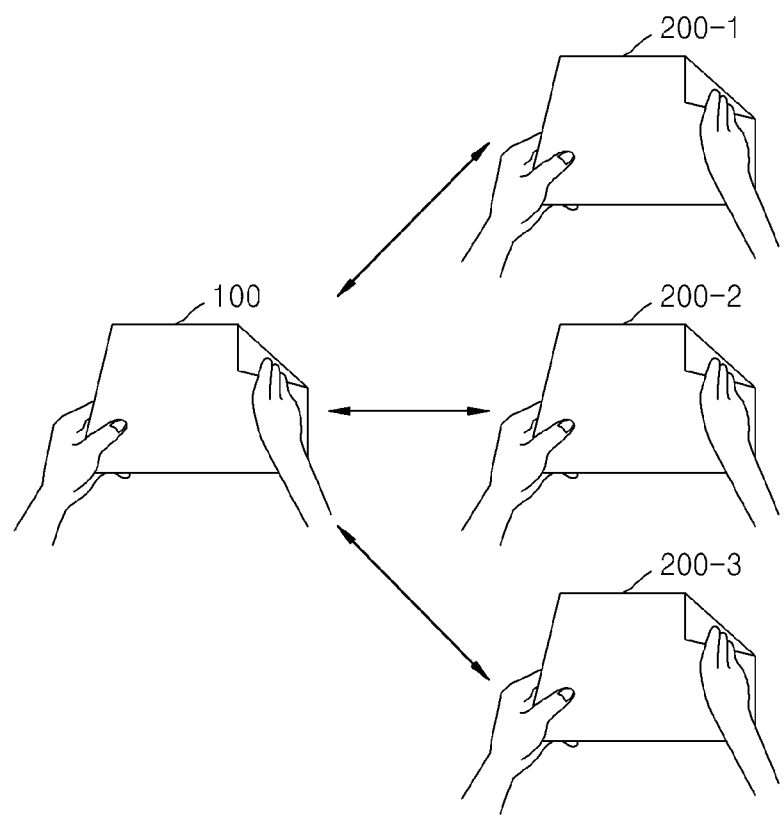
FIGS. 22A and 22B illustrate a method of, by the first display device, forming a communication link with a plurality of external display devices and sharing data with the plurality of external display devices, according to an exemplary embodiment.

As illustrated in FIG. 22A, the first display device 100 may receive information about a bending motion from each of a plurality of external display devices 200-1, 200-2, and 200-3, respectively.

When a difference between a start time of a first bending motion by the first display device 100 and a start time of a bending motion by each of the plurality of external display devices 200-1, 200-2, and 200-3 is less than a threshold value, the first display device 100 may establish a communication link with each of the plurality of external display devices 200-1, 200-2, and 200-3.

Also, the server 300 may receive information about a bending motion from each of the first display device 100 and the plurality of external display devices 200-1, 200-2, and 200-3. Here, when the difference between the start time of the first bending motion by the first display device 100 and the start time of the bending motion by each of the plurality of external display devices 200-1, 200-2, and 200-3 is less than the threshold value, the server 300 may transmit communication connection information to each of the first display device 100 and the plurality of external display devices 200-1, 200-2, and 200-3 so as to make them establish communication links therebetween.

Figure 22B:
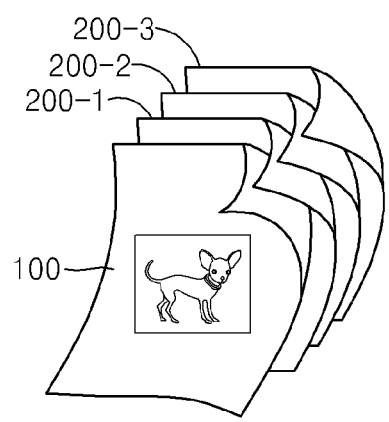

As illustrated in FIG. 22B, the first display device 100 and the plurality of external display devices 200-1, 200-2, and 200-3 may be stacked. Here, when bending motions with respect to the first display device 100 and the plurality of external display devices 200-1, 200-2, and 200-3 are detected, a communication link may be established between the first display device 100 and each of the plurality of external display devices 200-1, 200-2, and 200-3. Also, based on arrangement status information with respect to the first display device 100 and the plurality of external display devices 200-1, 200-2, and 200-3, content that is stored in the uppermost-positioned first display device 100 may be transmitted to the plurality of external display devices 200-1, 200-2, and 200-3 that are positioned below the first display device 100.

The invention may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for the present invention or may be well known to one of ordinary skill in the art. Examples of the computer-readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memory, and the like. Examples of the programmed commands include not only machine codes generated by a compiler but also include great codes to be executed in a computer by using an interpreter. The hardware apparatus may be configured to function as one or more software modules so as to perform operations of the invention, or vice versa.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of establishing, by a first display device, a communication link with a second display device, the method comprising:
    detecting a first bending motion of the first display device;
    receiving, from the second display device, information about a second bending motion generated by the second display device;
    comparing the first bending motion and the second bending motion, the first bending motion being detected while the second bending motion is detected by the second device; and
    establishing a communication link for a data exchange with the second display device when the first bending motion corresponds to the second bending motion, based on a difference between a start time of the first bending motion and a start time of the second bending motion and a result of the comparing,
    wherein the establishing of the communication link is performed when the difference between the start time of the first bending motion and the start time of the second bending motion is less than a predetermined threshold value.

2. The method of claim 1, wherein the establishing of the communication link comprises establishing the communication link further based on pattern information of the first bending motion and pattern information of the second bending motion.

3. The method of claim 1, wherein the establishing of the communication link comprises establishing the communication link further based on a distance difference between the first display device and the second display device.

4. The method of claim 1, wherein the establishing of the communication link comprises establishing the communication link further based on a correspondence between the first bending motion and the second bending motion.

5. The method of claim 4, wherein the establishing of the communication link comprises determining the correspondence between the first bending motion and the second bending motion, based on at least one from among a first bent position, a first bending direction, a first degree of bending, a first bending strength, a first bending speed, a first total number of times, a first start time, and a first elapsed-time of the first bending motion and a second bent position, a second bending direction, a second degree of bending, a second bending strength, a second bending speed, a second total number of times, a second start time, and a second elapsed-time of the second bending motion.

6. The method of claim 4, wherein the establishing of the communication link is performed when a difference between the first bending motion and the second bending motion is within a predetermined range.

7. The method of claim 4, wherein the establishing of the communication link is performed when the first bending motion and the second bending motion are symmetrical with respect to a predetermined axis.

8. The method of claim 4, wherein the communication link comprises at least one from among a wireless local area network (LAN), near field communication (NFC), Bluetooth, ZigBee, Wi-Fi Direct (WFD), and Ultra Wide Band (UWB).

9. The method of claim 1, wherein the establishing of the communication link comprises:
displaying a confirm request message about whether to establish the communication link between the first display device and the second display device; and
receiving, from a user, a confirmation with respect to the establishment of the communication link.

10. The method of claim 1, wherein the establishing of the communication link comprises displaying an image so as to guide the first bending motion for establishment of the communication link.

11. The method of claim 1, wherein the establishing of the communication link comprises:
receiving, from a user, selection with respect to at least one piece of content; and
automatically transmitting the at least one piece of content to the second display device via the communication link.

12. The method of claim 1, wherein the establishing of the communication link comprises obtaining arrangement status information with respect to the first display device and the second display device.

13. The method of claim 12, wherein the obtaining of the arrangement status information comprises obtaining the arrangement status information by using at least one from among a tactile sensor, a proximity sensor, an illuminance sensor, an NFC tag, and a radio frequency identification (RFID) tag.

14. The method of claim 1, wherein the establishing of the communication link comprises determining one of the first display device and the second display device, as a master device.

15. The method of claim 14, wherein the determining of the master device is performed based on at least one from among a first bent position, a first bending direction, a first degree of bending, a first bending strength, a first bending speed, a first total number of times, a first start time, and a first elapsed-time that of the first bending motion and a second bent position, a second bending direction, a second degree of bending, a second bending strength, a second bending speed, a second total number of times, a second start time, and a second elapsed-time of the second bending motion.

16. The method of claim 1, wherein the establishing of the communication link comprises:
detecting a third bending motion of the first display device, or receiving information about a fourth bending motion of the second display device; and
disconnecting the communication link, based on the third bending motion or the fourth bending motion.

17. The method of claim 16, wherein the disconnecting of the communication link is performed when a difference between the first bending motion and one of the third bending motion and the fourth bending motion is within a predetermined range.

18. The method of claim 16, wherein the disconnecting of the communication link is performed when the first bending motion and one of the third bending motion and the fourth bending motion are symmetrical with respect to a predetermined axis.

19. A non-transitory computer-readable recording medium having recorded thereon a program which, when executed by a computer, performs the method of claim 1.

20. The method of claim 1, wherein a tag is disposed on one portion of each display device and a tag reader is disposed on an opposed portion of each display device, respectively, in order to determine a stacking order of the first display device and the second display device.

21. The method of claim 1, further comprising:
automatically displaying content displayed on the first display device on the second display device upon establishing the communication link.

22. The method of claim 1, wherein the first bending motion being detected while the second bending motion is detected comprises: detecting that a peripheral portion of the first display device is bent towards an inner portion of the first display device while a peripheral portion of the second display device is bent towards an inner portion of the second display device.

23. A first display device comprising:
a sensor configured to detect a first bending motion of the first display device;
a communicator configured to receive, from a second display device, information about a second bending motion generated by the second display device; and
a controller configured to compare the first bending motion and the second bending motion, the first bending motion being detected while the second bending motion is detected by the second device, and to establish a communication link for a data exchange with the second display device when the first bending motion corresponds to the second bending motion, based on a difference between a start time of the first bending motion and a start time of the second bending motion and a result of the comparing,
wherein the controller is configured to establish the communication link when the difference between the start time of the first bending motion and the start time of the second bending motion is less than a predetermined threshold value.

24. The first display device of claim 23, wherein the controller is configured to establish the communication link further based on a pattern information of the first bending motion and pattern information of the second bending motion.

25. The first display device of claim 23, wherein the controller is configured to establish the communication link further based on a distance difference between the first display device and the second display device.

26. The first display device of claim 23, wherein the controller is configured to establish the communication link further based on a correspondence between the first bending motion and the second bending motion.

27. The first display device of claim 26, wherein the controller determines the correspondence between the first bending motion and the second bending motion, based on at least one from among a first bent position, a first bending direction, a first degree of bending, a first bending strength, a first bending speed, a first total number of times, a first start time, and a first elapsed-time of the first bending motion and a second bent position, a second bending direction, a second degree of bending, a second bending strength, a second bending speed, a second total number of times, a second start time, and a second elapsed-time of the second bending motion.

28. The first display device of claim 26, wherein the controller is configured to establish the communication link when a difference between the first bending motion and the second bending motion is within a predetermined range.

29. The first display device of claim 26, wherein the controller is configured to establish the communication link when the first bending motion and the second bending motion are symmetrical with respect to a predetermined axis.

30. The first display device of claim 23, wherein the communication link comprises at least one from among a wireless local area network (LAN), near field communication (NFC), Bluetooth, ZigBee, Wi-Fi Direct (WFD), and Ultra Wide Band (UWB).

31. The first display device of claim 23, further comprising a display unit configured to display a confirm request message about whether to establish the communication link between the first display device and the second display device.

32. The first display device of claim 23, further comprising a display unit configured to display an image so as to guide the first bending motion for establishment of the communication link.

33. The first display device of claim 23, wherein the sensor is configured to detect a user selection with respect to at least one piece of content, and
wherein the communicator is configured to automatically transmit the at least one piece of content to the second display device via the communication link.

34. The first display device of claim 23, wherein the controller is configured to obtain arrangement status information with respect to the first display device and the second display device.

35. The first display device of claim 34, wherein the controller is configured to obtain the arrangement status information by using at least one from among a tactile sensor, a proximity sensor, an illuminance sensor, an NFC tag, and a radio frequency identification (RFID) tag.

36. The first display device of claim 23, wherein the controller is configured to determine one from among the first display device and the second display device, as a master device.

37. The first display device of claim 36, wherein the controller is configured to determine the master device based on at least one from among a first bent position, a first bending direction, a first degree of bending, a first bending strength, a first bending speed, a first total number of times, a first start time, and a first elapsed-time of the first bending motion and a second bent position, a second bending direction, a second degree of bending, a second bending strength, a second bending speed, a second total number of times, a second start time, and a second elapsed-time of the second bending motion.

38. The first display device of claim 23, wherein the controller is configured to disconnect the communication link, based on a third bending motion of the first display device, that is detected by the sensor, or information about a fourth bending motion of the second display device, that is obtained by the communicator.

39. The first display device of claim 38, wherein the controller is configured to disconnect the communication link when a difference between the first bending motion and one of the third bending motion and the fourth bending motion is within a predetermined range.

40. The first display device of claim 38, wherein the controller is configured to disconnect the communication link when the first bending motion and one of the third bending motion and the fourth bending motion are symmetrical with respect to a predetermined axis.

41. A method of establishing by a server, a communication link between a first display device and a second display device, the method comprising:
obtaining information about a first bending motion of the first display device;
obtaining information about a second bending motion of the second display device;
comparing the first bending motion and the second bending motion, the first bending motion being detected by the first device while the second bending motion is detected by the second device; and
transmitting communication connection information to the first display device and the second display device, when the first bending motion corresponds to the second bending motion, based on a difference between a start time of the first bending motion and a start time of the second bending motion and a result of the comparing, wherein the communication connection information is required to establish the communication link between the first display device and the second display device, and
wherein the transmitting of the communication connection information is performed when the difference between the start time of the first bending motion and the start time of the second bending motion is less than a predetermined threshold value.

42. The method of claim 41, wherein the transmitting of the communication connection information comprises transmitting the communication connection information further based on pattern information of the first bending motion and pattern information of the second bending motion.

43. The method of claim 41, wherein the transmitting of the communication connection information comprises transmitting the communication connection information further based on a distance difference between the first display device and the second display device.

44. The method of claim 41, wherein the transmitting of the communication connection information comprises transmitting the communication connection information further based on correspondence between the first bending motion and the second bending motion.

45. The method of claim 44, wherein the transmitting of the communication connection information comprises determining the correspondence between the first bending motion and the second bending motion, based on at least one of a first bent position, a first bending direction, a first degree of bending, a first bending strength, a first bending speed, a first total number of times, a first start time, and a first elapsed-time of the first bending motion and a second bent position, a second bending direction, a second degree of bending, a second bending strength, a second bending speed, a second total number of times, a second start time, and a second elapsed-time of the second bending motion.

46. The method of claim 41, wherein the communication link comprises at least one from among a wireless local area network (LAN), near field communication (NFC), Bluetooth, ZigBee, Wi-Fi Direct (WFD), and Ultra Wide Band (UWB).

47. The method of claim 41, wherein the transmitting of the communication connection information comprises:
   transmitting identification (ID) information of the second display device, communication connection scheme information, and first authentication information to the first display device; and
   transmitting ID information of the first display device, the communication connection scheme information, and second authentication information to the second display device.

48. The method of claim 41, further comprising determining one of the first display device and the second display device, as a master device.

49. The method of claim 48, wherein the determining of the master device is performed based on at least one from among a first bent position, a first bending direction, a first degree of bending, a first bending strength, a first bending speed, a first total number of times, a first start time, and a first elapsed-time of the first bending motion and a second bent position, a second bending direction, a second degree of bending, a second bending strength, a second bending speed, a second total number of times, a second start time, and a second elapsed-time of the second bending motion.

50. A method of communication between a first device and a second device, the method comprising:
   detecting a first fold in the first device;
   receiving, from the second device, information about a second fold generated by the second device;
   comparing the first fold and the second fold, the first fold being detected while the second fold is detected by the second device; and
   starting a communication link between the first device and the second device based on a result of the comparing, when the first fold corresponds to the second fold,
   wherein the first device acquires identifying information of the second device prior to detecting the first fold, and
   wherein the starting the communication link is performed when a difference between a start time of the first fold and a start time of the second fold is less than a predetermined threshold value.

51. The method of claim 50, wherein the starting the communication link comprises starting the communication link when the second fold is detected at substantially at a same time the first fold is detected or when the second fold is detected within a preset amount of time after the first fold is detected.

52. The method of claim 50, wherein the starting the communication link comprises comparing a geometry of the first fold with a geometry of the second fold or comparing a folding motion of the first fold with a folding motion of the second fold.

53. A method of bending of flexible display devices to control transmitting data between a first display device and a second display device, the method comprising:
   selecting an object displayed on the first display device;
   detecting a first bending motion of the first display device;
   receiving, from the second display device, information about a second bending motion generated by the second display device;
   comparing the first bending motion and the second bending motion, the first bending motion being detected while the second bending motion is detected by the second device;
   establishing a communication link for a data exchange with the second display device, when there is a correspondence between the first bending motion and the second bending motion, based on a difference between a start time of the first bending motion and a start time of the second bending motion and a result of the comparing; and
   automatically transmitting the selected object to the second display device,
   wherein the first display device acquires identifying information of the second display device prior to detecting the first bending motion, and
   wherein the establishing of the communication link is performed when the difference between the start time of the first bending motion and the start time of the second bending motion is less than a predetermined threshold value.

* * * * *